United States Patent
Roth et al.

(10) Patent No.: US 6,949,594 B2
(45) Date of Patent: Sep. 27, 2005

(54) MOLECULAR WEIGHT MODIFICATION OF THERMOPLASTIC POLYMERS

(75) Inventors: Michael Roth, Lautertal (DE); Rudolf Pfaendner, Rimbach (DE); Dirk Simon, Mutterstadt (DE)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 0 days.

(21) Appl. No.: 10/296,346

(22) PCT Filed: May 22, 2001

(86) PCT No.: PCT/EP01/05863

§ 371 (c)(1),
(2), (4) Date: Nov. 25, 2002

(87) PCT Pub. No.: WO01/92397

PCT Pub. Date: Dec. 6, 2001

(65) Prior Publication Data

US 2003/0176588 A1 Sep. 18, 2003

(30) Foreign Application Priority Data

May 30, 2000 (CH) .............................................. 1083/00

(51) Int. Cl.⁷ .................... C08L 5/3435; C08L 5/3477; C08L 5/357; C08L 5/3412

(52) U.S. Cl. ........................ 524/99; 524/100; 524/101; 524/86; 524/105; 524/306; 524/315

(58) Field of Search .................... 524/99, 100, 86, 524/236, 583, 585; 525/203, 206, 225

(56) References Cited

U.S. PATENT DOCUMENTS 5,204,473 A * 4/1993 Winter et al. ................ 546/188
5,910,549 A * 6/1999 Matyjaszewski et al. ... 526/217
5,948,836 A * 9/1999 Bonora ......................... 524/99
5,981,674 A   11/1999 Schombourg et al. ....... 526/279

FOREIGN PATENT DOCUMENTS

EP      0742257           11/1996
EP      0 742 257 A1 *    11/1996    ......... C08K/5/3435

OTHER PUBLICATIONS

Derwent Abstract 1995–371230 [48] for JP 7252392 (1995).

* cited by examiner

*Primary Examiner*—David W. Wu
*Assistant Examiner*—Rip A. Lee
(74) *Attorney, Agent, or Firm*—Tyler A. Stevenson

(57) ABSTRACT

The invention relates to a process for the molecular weight increase/crosslinking of non-halogen-containing thermoplastic polymers, in which process a composition comprising a) a non-halogen-containing thermoplastic polymer; b) a functional compound having at least two unsaturated carbon bonds; and c) an alkoxyamine having a structural unit (I), which forms free radicals at the melting temperature/processing temperature of the polymer, is mixed and heated above the melting point of the polymer in the case of crystalline polymers or the softening point in the case of amorphous polymers. The invention relates also to the composition itself, to the use thereof in increasing the molecular weight of polymers and to polymers having increased molecular weight or crosslinked polymers prepared in accordance with that process

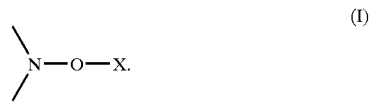

16 Claims, No Drawings

MOLECULAR WEIGHT MODIFICATION OF THERMOPLASTIC POLYMERS

The invention relates to a process for the controlled molecular weight increase/crosslinking of thermoplastic non-halogenated polymers by heating above the melting point in the presence of a poly-unsaturated compound and an alkoxyamine compound that releases free radicals at the melting/processing temperature. The invention relates also to compositions comprising the components mentioned above, to the use of poly-unsaturated compounds and an alkoxyamine compound in increasing the molecular weight of thermoplastic polymers and to thermoplastic polymers having increased molecular weight or (partially) crosslinked thermoplastic polymers prepared in accordance with that process.

The controlled preparation of polyolefin grades (polymer types of different molecular mass, melt viscosity, density, molecular mass distribution, etc.) by customary compounding processes, for example by extrusion or injection moulding, is a process used by polymer manufacturers, polymer processors and compounders.

The high molecular weight polyolefin grades required for pipe and cable manufacture are prepared chiefly by crosslinking with peroxides (Engel process: RAM extrusion with the addition of peroxides; Sioplas process: peroxide-initiated grafting of vinyl silanes and subsequent crosslinking with water, see "Die Kunststoffe und ihre Eigenschaften", Springer Verlag, Berlin, 5th edition 1998, 2.1.1, pages 156–159). Those processes have crucial disadvantages, however, since the crosslinking reactions proceed in an uncontrolled manner and secondary reactions can have an adverse effect on the processing behaviour of the polymers (gel formation, high melt viscosities). Peroxide reaction products and peroxide residues may also result in an impairment of the long-term stability of the polymers. The safety aspects of plastics processing with the addition of peroxides also play a major role. Whereas some special polymer types (LDPE, MDPE, HDPE, LLDPE, iPP, sPP, iPS, etc.) are obtainable by special polymerisation techniques using metallocene and Ziegler catalysts, it is common in the art for standard polyolefin types (polymer grades) to be modified economically in a processing step carried out after synthesis.

If the desired parameters, for example the melt viscosity (MFR as a measure of the molecular weight) are to be established by means of a plastics processing step, it is essential to the success of the reaction that the reactivity and mode of action of the added additives/additive systems be controlled. Crosslinking reactions with peroxides, polyunsaturated olefins or unsaturated polymers generally present processing problems, such as, for example, very high melt viscosities and gel formation as a result of uncontrolled, excessive crosslinking.

There is therefore a need for an easily manageable, effective additive system that allows controlled crosslinking, e.g. the establishment of a specific melt viscosity as a measure of the molecular weight, during a plastics processing process.

That problem is solved in an advantageous manner using the composition according to the invention based on poly-functional unsaturated compounds and alkoxyamine compounds, The components can be added in simple manner during the processing of the polymer. According to the amount, quantity ratio and processing conditions, such as temperature and time, the properties of the polymer can be altered selectively so that the desired "polymer grades" are readily obtainable and the desired parameters, e.g. the melt viscosity, can be established in an advantageous manner.

Unlike crosslinking reactions using peroxides, the increase and crosslinking reactions according to the invention do not give rise to any impairment of the heat stability or the light stability, and there is good compatibility with the additives customary for the processing and long-term stabilisation, so that no further special steps have to be taken.

The invention relates to a process for the molecular weight increase/crosslinking of non-halogen-containing thermoplastic polymers, in which process a composition comprising a) a non-halogen-containing thermoplastic polymer;
b) a functional compound having at least two unsaturated carbon bonds; and
c) an alkoxyamine having a structural unit

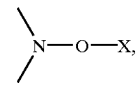

which forms free radicals at the melting temperature/processing temperature of the polymer, is mixed and heated above the melting point of the polymer in the case of crystalline polymers or the softening-point in the case of amorphous polymers.

In the context of the present invention, thermoplastic polymers are to be understood as being the following polymers.

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).
b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EM), LLDPE/EVA, LLDPE/EM and alternating or random polyalkylene/carbon monoxide copolymers and mixtures thereof with other polymers, for example polyamides.

Homopolymers and copolymers from 1.)–3.) may have any stereostructure including syndiotactic, isotactic, hemi-isotactic or atactic; where atactic polymers are preferred. Stereoblock polymers are also included.

4. Polystyrene, poly(p-methylstyrene), poly($\alpha$-methylstyrene).

5. Aromatic homopolymers and copolymers derived from vinyl aromatic monomers including styrene, $\alpha$-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

5a. Copolymers including aforementioned vinyl aromatic monomers and comonomers selected from ethylene, propylene, dienes, nitriles, acids, maleic anhydrides, maleimides and vinyl acetate or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrenelacrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrenelisoprene/styrene, styrene/ethylene/butylene/styrene or styrene/ethylene/propylene/styrene.

5b. Hydrogenated aromatic polymers derived from hydrogenation of polymers mentioned under 5.), especially including polycyclohexylethylene (PCHE) prepared by hydrogenating atactic polystyrene, often referred to as polyvinylcyclohexane (PVCH).

5c. Hydrogenated aromatic polymers derived from hydrogenation of polymers mentioned under 5a.).

Homopolymers and copolymers may have any stereostructure including syndiotactic, isotactic, hemi-isotactic or atactic; where atactic polymers are preferred. Stereoblock polymers are also included.

6. Graft copolymers of vinyl aromatic monomers such as styrene or $\alpha$-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylatelbutadiene copolymers, as well as mixtures thereof with the copolymers listed under 5), for example the copolymer mixtures known as ABS, MBS, ASA or AES polymers.

7. Polymers derived from $\alpha,\beta$-unsaturated acids and derivatives thereof such as polyacrylates and polymethacrylates; polymethyl methacrylates, polyacrylamides and polyacrylonitriles, impact-modified with butyl acrylate.

8. Copolymers of the monomers mentioned under 7) with each other or with other unsaturated monomers, for example acrylonitrile/butadiene copolymers, acrylonitrile/alkyl acrylate copolymers, acrylonitrile/alkoxyalkyl acrylate or acrylonitrile/alkyl methacrylate/butadiene terpolymers.

9. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

10. Homopolymers and copolymers of cyclic ethers such as polyalkylene glycols, polyethylene oxide, polypropylene oxide or copolymers thereof with bisglycidyl ethers.

11. Polyacetals such as polyoxymethylene and those polyoxymethylenes which contain ethylene oxide as a comonomer; polyacetals modified with thermoplastic polyurethanes, acrylates or MBS.

12. Polyphenylene oxides and sulfides, and mixtures of polyphenylene oxides with styrene polymers or polyamides.

13. Polyurethanes derived from hydroxyl-terminated polyethers, polyesters or polybutadienes on the one hand and aliphatic or aromatic polyisocyanates on the other, as well as precursors thereof.

14. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

15. Polyureas, polyimides, polyamide-imides, polyetherimids, polyesterimids, polyhydantoins and polybenzimidazoles.

16. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

17. Polycarbonates and polyester carbonates.

18. Polyketones.

19. Polysulfones, polyether sulfones and polyether ketones.

20. Blends of the aforementioned polymers (polyblends), for example PP/EPDM, Polyamide/EPDM or ABS, PC/ABS, PBTP/ABS, PC/ASA, PC/PBT, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

The process is preferably carried out at a temperature of from 140° C. to 300° C.

Preference is given to polyolefins and polystyrene in their various modifications and mixtures; polyethylene and polypropylene are especially preferred.

The alkoxyamines may be open-chain or cyclic amines. Suitable open-chain alkoxyamines are known and are described, for example, in WO 96/24620, WO 00/07981, WO 99/03984, EP-A-0 891 986 and WO 98/13392.

Specific examples are mentioned below.

101 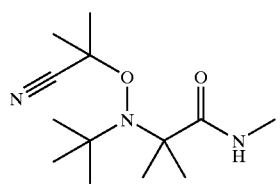

102 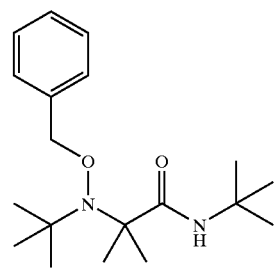

103 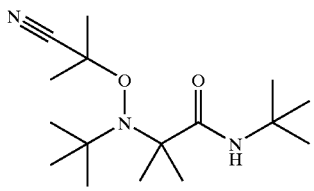

104 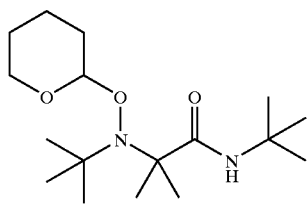

105 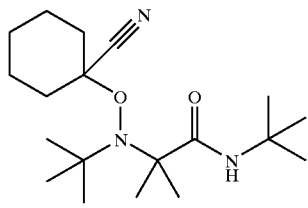

106 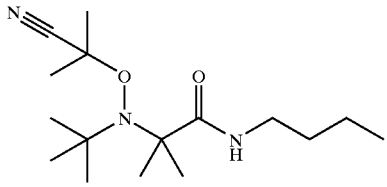

107 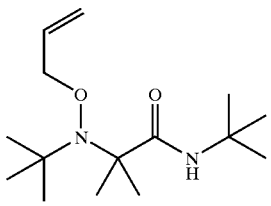

108 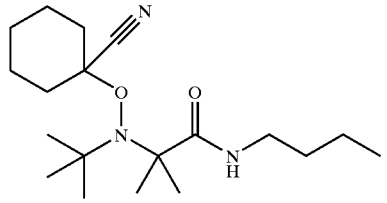

109 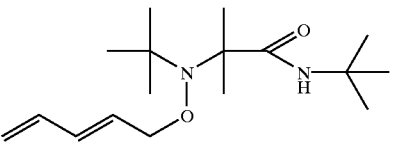

110 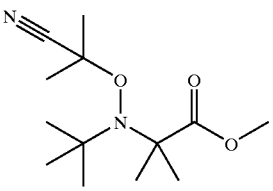

-continued
111 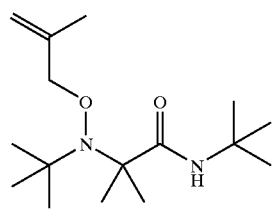
112 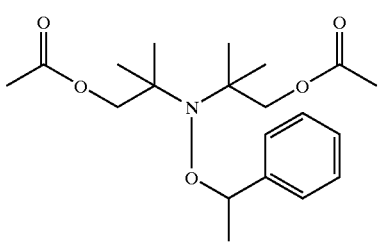
113 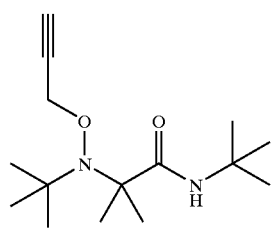
114 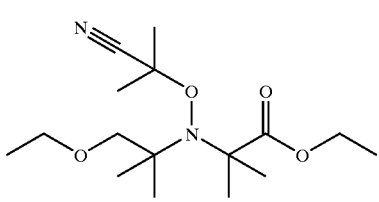
115 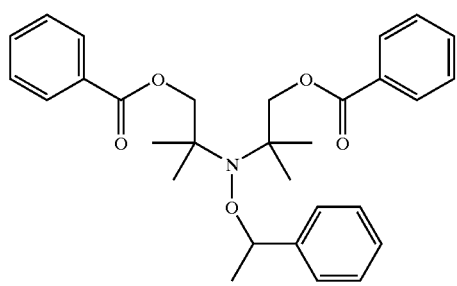
116 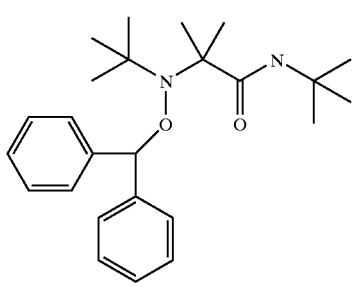
Cyclic alkoxyamines are likewise known and are described, for example, in GB 2335190, WO 98/30601, WO 98/44008 and GB 2342649.
Examples are listed below.
5-membered ring systems
| No. | Structure |
|---|---|
| 201 | 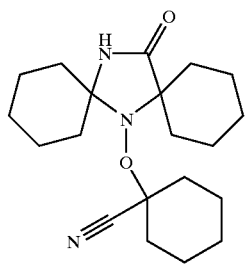 |
| 202 | 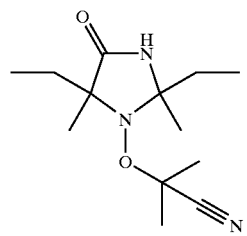 |
| 203 | 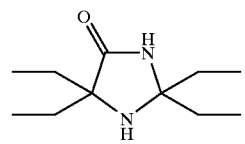 |
| 204 | 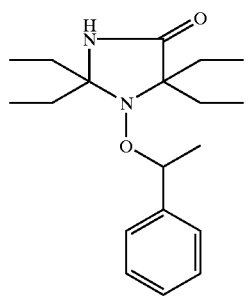 |
| 205 | 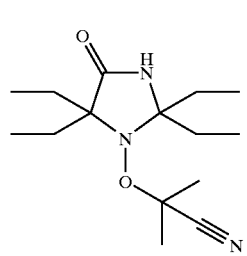 |
| 206 | 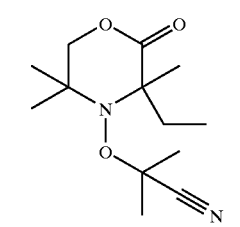 |

-continued
| No. | Structure |
|---|---|
| 207 | 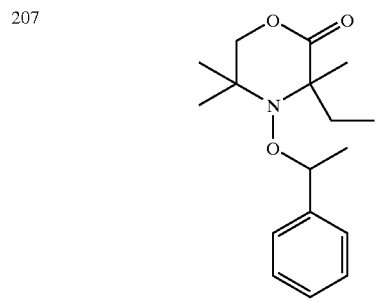 |
| 208 | 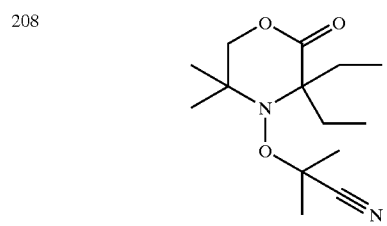 |
| 209 | 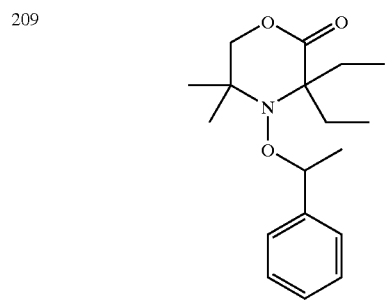 |
| 210 | 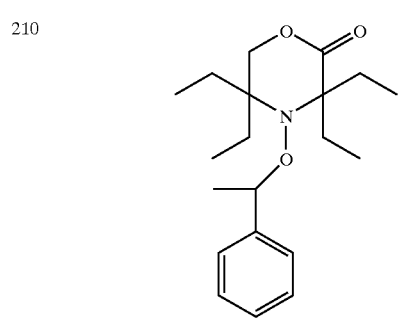 |
| 211 | 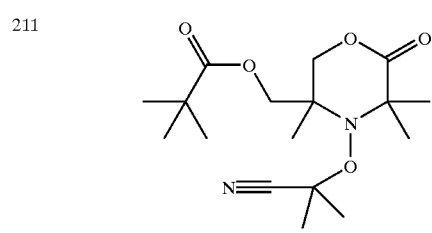 |
-continued
| No. | Structure |
|---|---|
| 212 | 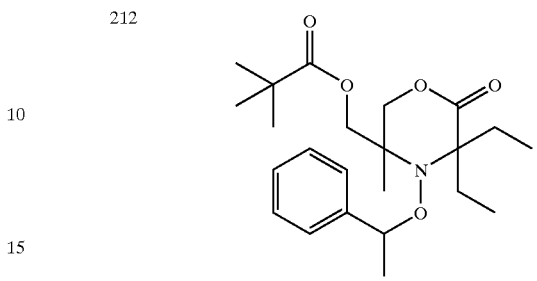 |
| 213 | 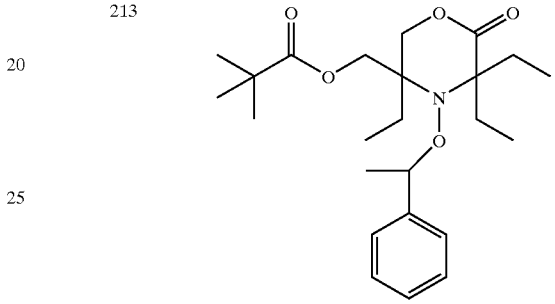 |
| 214 | 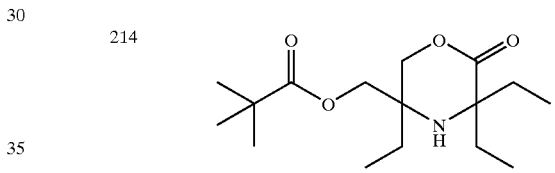 |
| 215 | 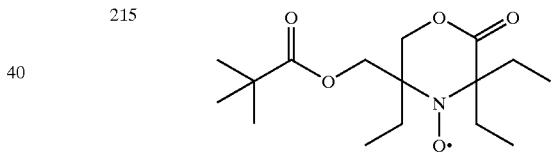 |
| 216 | 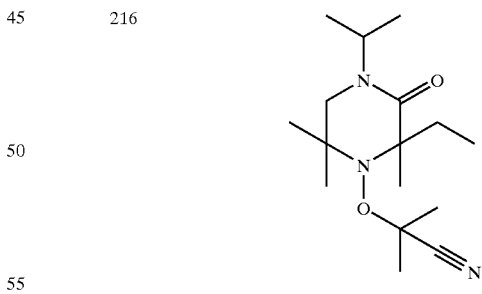 |
| 217 | 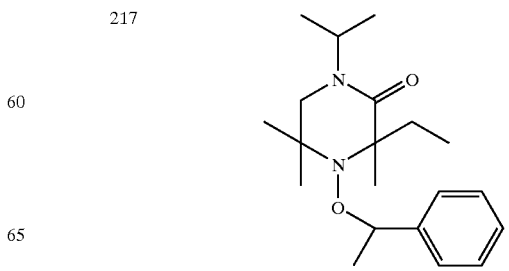 |

| No. | Structure |
|---|---|
| 218 | 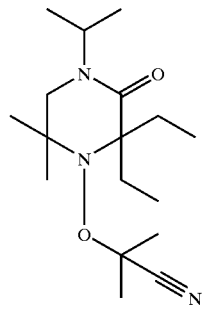 |
| 219 | 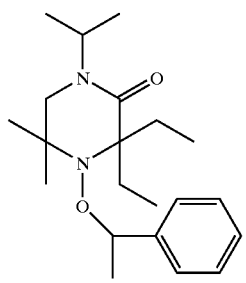 |
| 220 | 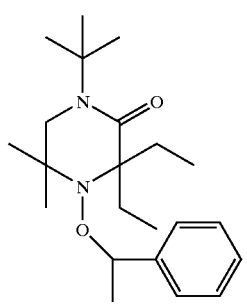 |
| 221 | 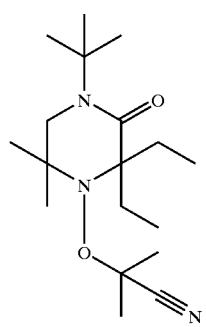 |
| 222 | 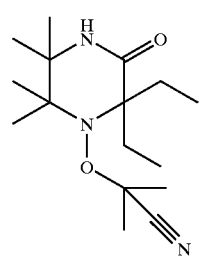 |
| No. | Structure |
|---|---|
| 223 | 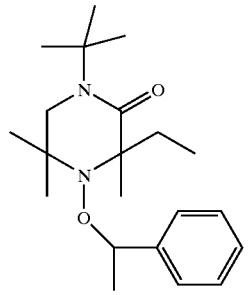 |
| 224 | 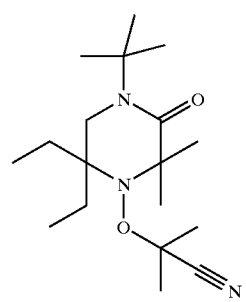 |
| 225 | 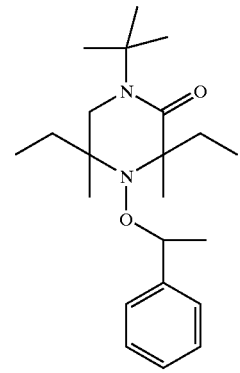 |
| 226 | 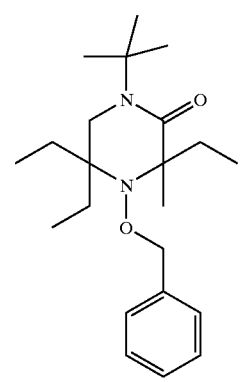 |

-continued
| No. | Structure |
|-----|-----------|
| 227 | 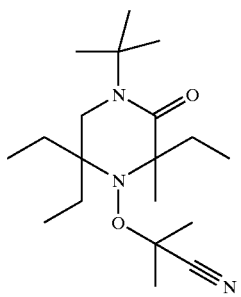 |
| 228 | 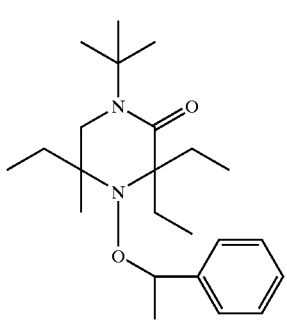 |
| 229 | 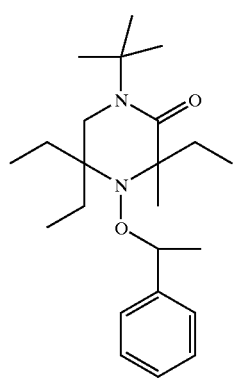 |
| 230 | 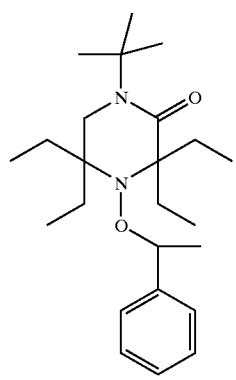 |
-continued
| No. | Structure |
|-----|-----------|
| 231 | 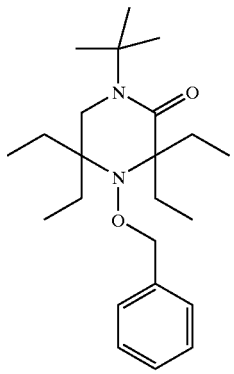 |
| 232 | 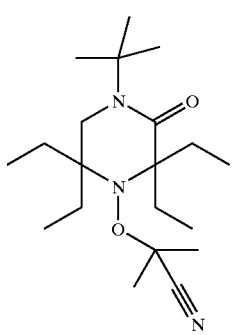 |
| 233 | 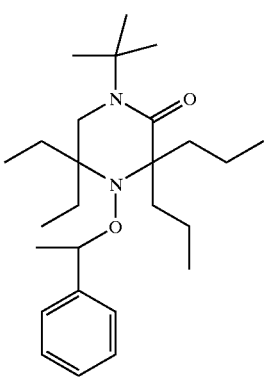 |
| 234 | |

-continued
| No. | Structure |
|---|---|
| 235 | 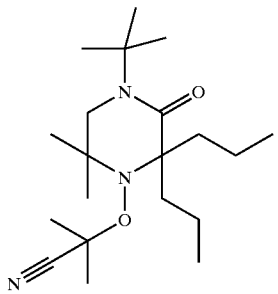 |
| 236 | 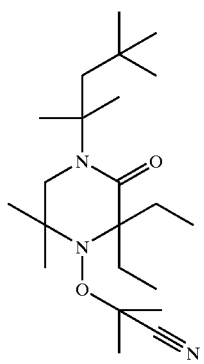 |
| 237 | 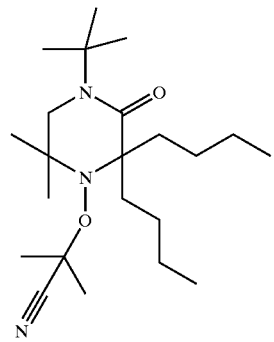 |
| 238 | 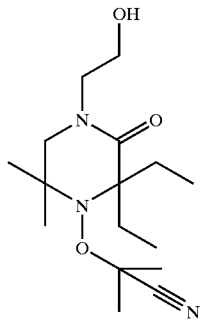 |
-continued
| No. | Structure |
|---|---|
| 239 | 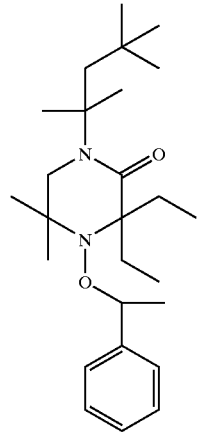 |
| 240 | 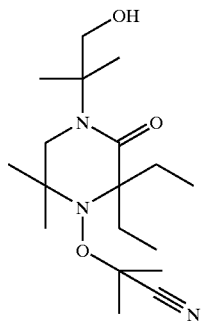 |
| 241 | 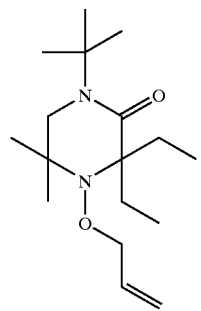 |
| 242 | 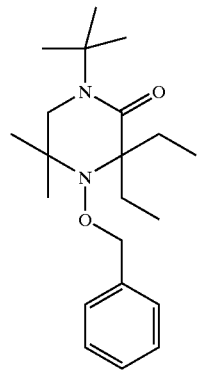 |

-continued
| No. | Structure |
|---|---|
| 243 | 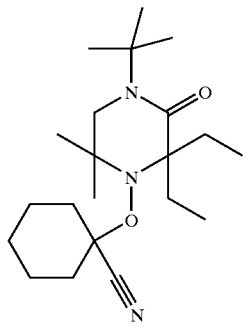 |
| 244 | 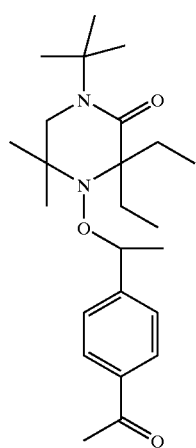 |
| 245 | 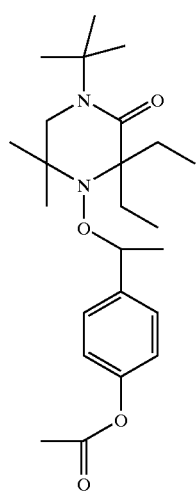 |
-continued
| No. | Structure |
|---|---|
| 246 | 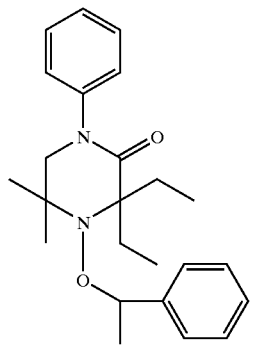 |
| 247 | 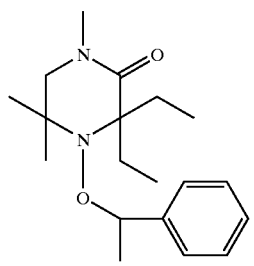 |
| 248 | 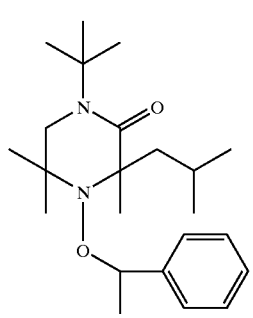 |
7-membered ring systems
| | |
|---|---|
| 301 | 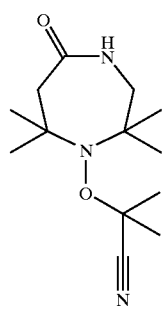 |

| No. | Structure |
|---|---|
| 302 | 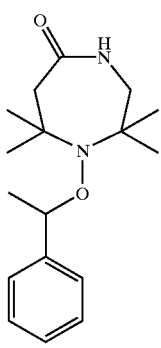 |
| 307 | 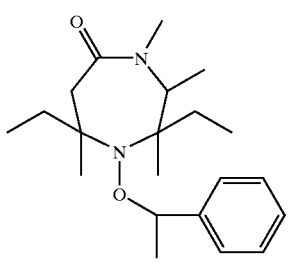 |
| 304 | 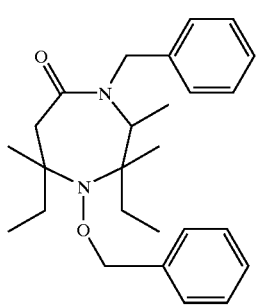 |
| 305 | 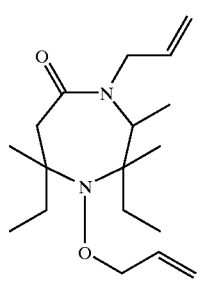 |
| 310 | 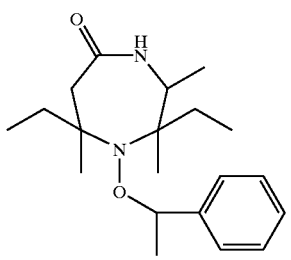 |

| No. | Structure |
|---|---|
| 309 | 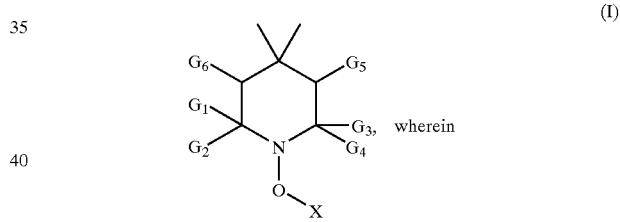 |
| 313 | 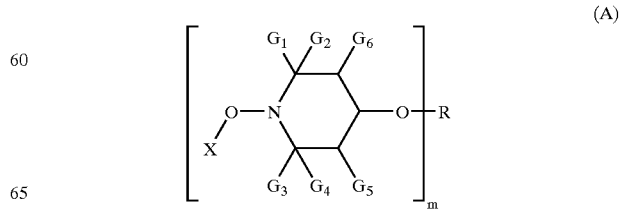 |

The alkoxyamine is preferably a cyclic amine and contains a structural unit of formula (I)

$$\text{(I)}$$

wherein $G_1$, $G_2$, $G_3$, $G_4$ are independently $C_1$–$C_6$alkyl or
$G_1$ and $G_2$ or $G_3$ and $G_4$, or $G_1$ and $G_2$ and $G_3$ and $G_4$ together with the carbon atom to which they are bonded form a $C_5$–$C_{12}$cycloalkyl group; and
$G_5$ and $G_6$ are each independently of the other H, $C_1$–$C_{18}$alkyl, phenyl, naphthyl or a group $COOC_1$–$C_{18}$alkyl; and
X is a group capable to induce a split of the N—O or O—X bond at the processing temperature.

Preference is given to a composition wherein the structural unit of formula (I) is one of the structural formulae A to S $$\text{(A)}$$

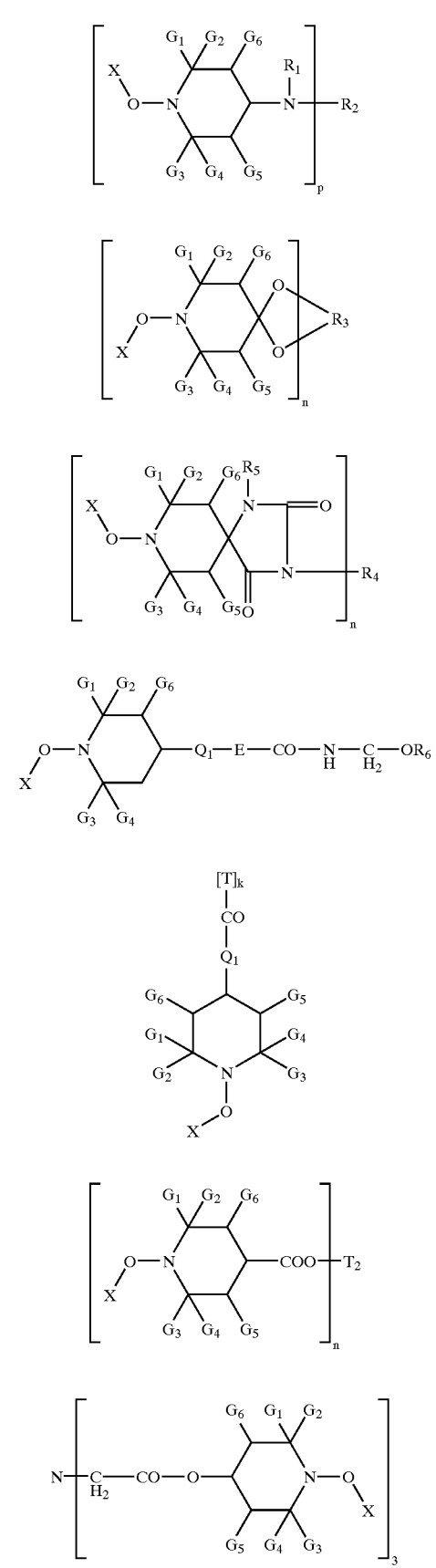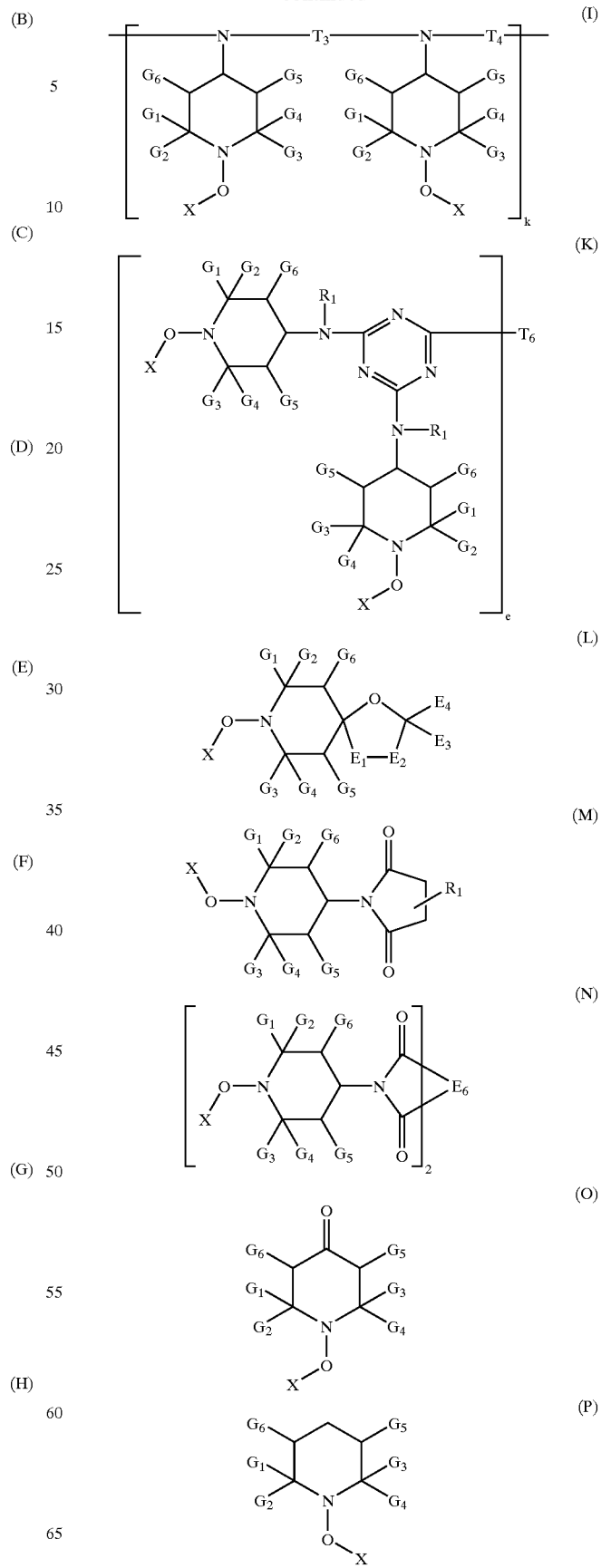

-continued

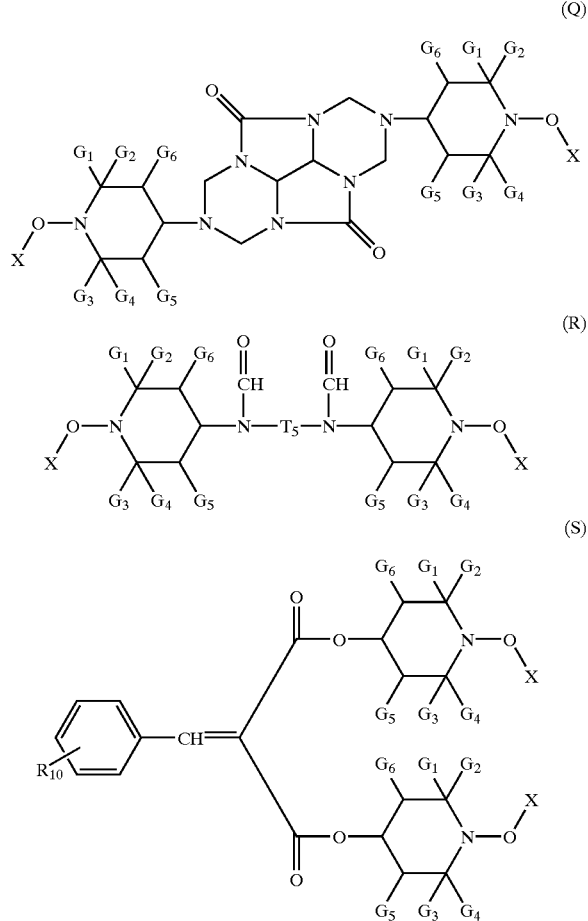

wherein $G_1$, $G_2$, $G_3$ and $G_4$ are independently $C_1$–$C_4$alkyl or $G_1$ and $G_2$ together and $G_3$ and $G_4$ together, or $G_1$ and $G_2$ together or $G_3$ and $G_4$ together are pentamethylene;

$G_5$ and $G_6$ are each independently of the other hydrogen or $C_1$–$C_4$alkyl; and X is a group capable to induce a split of the N—O or O—X bond at the processing temperature;

m is a number from 1 to 4;

when m is 1,

R is hydrogen, $C_1$–$C_{18}$alkyl uninterrupted or interrupted by one or more oxygen atoms, cyanoethyl, benzyl, glycidyl, a monovalent radical of an aliphatic carboxylic acid having from 2 to 18 carbon atoms, of a cycloaliphatic carboxylic acid having from 7 to 15 carbon atoms, of an α,β-unsaturated carboxylic acid having from 3 to 5 carbon atoms or of an aromatic carboxylic acid having from 7 to 15 carbon atoms, of a carbamic acid or of a phosphorus-containing acid or is a monovalent silyl radical, it being possible in each case for the carboxylic acid to be substituted in the aliphatic, cycloaliphatic or aromatic moiety by from 1 to 3 —$COOZ_{12}$ groups, wherein $Z_{12}$ is hydrogen, $C_1$–$C_{20}$alkyl, $C_3$–$C_{12}$alkenyl, $C_5$–$C_7$cycloalkyl, phenyl or benzyl;

when m is 2,

R is $C_2$–$C_{12}$alkylene, $C_4$–$C_{12}$alkenylene, xylylene, a divalent radical of an aliphatic dicarboxylic acid having from 2 to 36 carbon atoms, of a cycloaliphatic or aromatic dicarboxylic acid having from 8 to 14 carbon atoms or of an aliphatic, cycloaliphatic or aromatic dicarbamic acid having from 8 to 14 carbon atoms, it being possible in each case for the dicarboxylic acid to be substituted in the aliphatic, cycloaliphatic or aromatic moiety by 1 or 2 —$COOZ_{12}$ groups;

when m is 3,

R is a trivalent radical of an aliphatic, cycloaliphatic or aromatic tricarboxylic acid which may be substituted in the aliphatic, cycloaliphatic or aromatic moiety by —$COOZ_{12}$, of an aromatic tricarbamic acid or of a phosphorus-containing acid or is a trivalent silyl radical;

when m is 4,

R is a tetravalent radical of an aliphatic, cycloaliphatic or aromatic tetracarboxylic acid;

p is 1, 2 or 3, $R_1$ is $C_1$–$C_{12}$alkyl, $C_5$–$C_7$cycloalkyl, $C_7$–$C_8$aralkyl, $C_2$–$C_{18}$alkanoyl, $C_3$–$C_5$alkenoyl or benzoyl;

when p is 1, $R_2$ is $C_1$–$C_{18}$alkyl, $C_5$–$C_7$cycloalkyl, $C_3$–$C_8$alkenyl, each unsubstituted or substituted by a cyano, carbonyl or carbamide group, or glycidyl, a group of formula —$CH_2CH(OH)$—Z or of formula —CO—Z— or —CONH—Z, wherein Z is hydrogen, methyl or phenyl; or when p is 1, $R_1$ and $R_2$ together may also be a cyclic acyl radical of an aliphatic or aromatic 1,2- or 1,3-dicarboxylic acid;

when p is 2, $R_2$ is $C_2$–$C_{12}$alkylene, $C_6$–$C_{12}$arylene, xylylene, a group —$CH_2CH(OH)CH_2$—O—B—O—$CH_2CH(OH)CH_2$—, wherein B is $C_2$–$C_{10}$alkylene, $C_6$–$C_{15}$arylene or $C_6$–$C_{12}$cycloalkylene; or, when $R_1$ is not alkanoyl, alkenoyl or benzoyl, $R_2$ may also be a divalent acyl radical of an aliphatic, cycloaliphatic or aromatic dicarboxylic acid or carbamic acid or is the group —CO—; or $R_2$ is a group

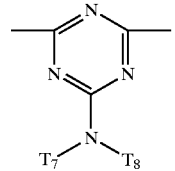

wherein $T_7$ and $T_8$ are each independently of the other hydrogen, $C_1$–$C_{18}$alkyl, or $T_7$ and $T_8$ together are $C_4$–$C_6$alkylene or 3-oxapentamethylene;

when p is 3, $R_2$ is 2,4,6-triazinyl;

when n is 1, $R_3$ is $C_2$–$C_8$alkylene or hydroxyalkylene or $C_4$–$C_{22}$acyloxyalkylene; or when n is 2,

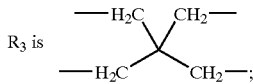

when n is 1, $R_4$ is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$alkoxyalkyl, $C_6$–$C_{10}$aryl, glycidyl, a group of formula —$(CH_2)_{m'}$—COO—Q or of formula —$(CH_2)_{m'}$—O—CO—Q, wherein m' is 1 or 2 and Q is $C_1$–$C_4$alkyl or phenyl; or when n is 2, $R_4$ is $C_2$–$C_{12}$alkylene, $C_6$–$C_{12}$arylene, a group —$CH_2CH(OH)CH_2$—O—D—O—$CH_2CH(OH)CH_2$—, wherein D is $C_2$–$C_{10}$alkylene, $C_6$–$C_{15}$arylene or $C_6$–$C_{12}$cycloalkylene, or a group —$CH_2CH(OZ_1)CH_2$—$(OCH_2CH(OZ_1)CH_2)_2$—, wherein $Z_1$ is hydrogen, $C_1$–$C_{11}$alkyl, allyl, benzyl, $C_2$–$C_{12}$alkanoyl or benzoyl;

$R_5$ is hydrogen, $C_1$–$C_{12}$alkyl, allyl, benzyl, glycidyl or $C_2$–$C_6$alkoxyalkyl;

$Q_1$ is —$N(R_7)$— or —O—;

E is $C_1$–$C_3$alkylene, the group —$CH_2CH(R_8)$—O—, wherein $R_8$ is hydrogen, methyl or phenyl, the group —$(CH_2)_3$—NH— or a direct bond;

$R_7$ is $C_1$–$C_{18}$alkyl, $C_5$–$C_7$cycloalkyl, $C_7$–$C_{12}$aralkyl, cyanoethyl, $C_6$–$C_{10}$aryl, the group —$CH_2CH(R_8)$—OH; or a group of formula or a group of formula wherein G is $C_2$–$C_6$alkylene or $C_6$–$C_{12}$arylene and R is as defined above; or $R_7$ is a group —E—CO—NH—$CH_2$—$OR_6$;

$R_6$ is hydrogen or $C_1$–$C_{18}$alkyl;

formula (F) denotes a structural repeating unit of an oligomer, wherein T is ethylene or 1,2-propylene, or a structural repeating unit derived from an α-olefin copolymer with an alkyl acrylate or methacrylate;

k is a number from 2 to 100;

$R_{10}$ is hydrogen, $C_1$–$C_{12}$alkyl or $C_1$–$C_{12}$alkoxy;

$T_2$ has the same meanings as $R_4$;

$T_3$ and $T_4$ are each independently of the other $C_2$–$C_{12}$alkylene, or $T_4$ is a group $T_5$ is $C_2$–$C_{22}$alkylene, $C_5$–$C_7$cycloalkylene, $C_1$–$C_4$alkylenedi($C_5$–$C_7$cycloalkylene), phenylene or phenylenedi($C_1$–$C_4$alkylene);

$T_6$ is —NH$(CH_2)_a$—N$(CH_2)_b$—N$[(CH_2)_c$—N—$]_dH$, wherein a, b and c are each independently of the others 2 or 3, and d is 0 or 1;

e is 3 or 4;

$E_1$ and $E_2$ are different and are oxo or imino;

$E_3$ is hydrogen, $C_1$–$C_{30}$alkyl, phenyl, naphthyl, it being possible for the phenyl or naphthyl to be substituted by chlorine or by $C_1$–$C_4$alkyl, or $C_7$–$C_{12}$phenylalkyl or $C_1$–$C_4$alkyl-substituted $C_7$–$C_{12}$phenylalkyl;

$E_4$ is hydrogen, $C_1$–$C_{30}$alkyl, phenyl, naphthyl or $C_7$–$C_{12}$phenylalkyl; or $E_3$ and $E_4$ together are $C_4$–$C_{17}$polymethylene, which may be substituted by up to 4 $C_1$–$C_4$alkyl groups; and $E_6$ is an aliphatic or aromatic tetravalent radical.

The carboxylic acid radicals indicated in each case include radicals of formula (—CO)$_n$R, wherein the meaning of n is indicated above and the meaning of R can be found in the definition given.

If any of the substituents are $C_1$–$C_{12}$alkyl, they are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

R as $C_1$–$C_{18}$alkyl may be, for example, the groups listed above and also e.g. n-tridecyl, n-tetradecyl, n-hexadecyl or n-octadecyl.

When R is $C_3$–$C_8$alkenyl, it may be, for example, 1-propenyl, allyl, methallyl, 2-butenyl, 2-pentenyl, 2-hexenyl, 2-octenyl or 4-tert-butyl-2-butenyl.

$C_5$–$C_7$Cycloalkyl is, for example, cyclopentyl, cyclohexyl or cycloheptyl.

When R is a monovalent radical of a carboxylic acid, R is, for example, an-acetic acid, caproic acid, stearic acid, acrylic acid, methacrylic acid, benzoic acid or α-(3,5-di-tert-butyl-4-hydroxy-phenyl)-propionic acid radical.

When R is a monovalent silyl radical, $G_{12}$ is, for example, a radical of the formula —$(C_jH_{2j})$-Si$(Z')_2Z''$, wherein j is an integer in the range of 2 to 5, and Z' and Z'' are each independently of the other $C_1$–$C_4$alkyl or $C_1$–$C_4$alkoxy.

When R is a divalent radical of a dicarboxylic acid, R is, for example, a malonic acid, succinic acid, glutaric acid, adipic acid, suberic acid, sebacic acid, maleic acid, itaconic acid, phthalic acid, dibutylmalonic acid, dibenzylmalonic acid, butyl-(3,5-di-tert-butyl-4-hydroxybenzyl)-malonic acid or bicycloheptenedicarboxylic acid radical.

Further suitable dicarboxylic acids having up to 36 carbon atoms are the following dimer acids, and mixtures thereof.

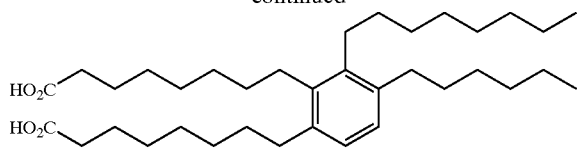

When R is a trivalent radical of a tricarboxylic acid, R is, for example, a trimellitic acid, citric acid or nitrilotriacetic acid radical.

When R is a tetravalent radical of a tetracarboxylic acid, R is, for example, the tetravalent radical of butane-1,2,3,4-tetracarboxylic acid or of pyromellitic acid.

When R is a divalent radical of a dicarbamic acid, R is, for example, a hexamethylene-dicarbamic acid radical or a 2,4-toluylenedicarbamic acid radical.

$C_7$–$C_8$Aralkyl is especially phenethyl and more especially benzyl.

$C_1$–$C_8$Alkanoyl is, for example, formyl, propionyl, butyryl, octanoyl, but preferably acetyl and as $C_3$–$C_5$alkenoyl is especially acryloyl.

If any of the substituents are $C_1$–$C_{12}$- or $C_1$–$C_{18}$-alkyl, they have the meanings already given above.

If any of the substituents are $C_5$–$C_7$cycloalkyl, they are especially cyclohexyl.

$C_2$–$C_5$Hydroxyalkyl is especially 2-hydroxyethyl or 2-hydroxypropyl.

$C_2$–$C_{18}$Alkanoyl is, for example, propionyl, butyryl, octanoyl, dodecanoyl, hexadecanoyl, octadecanoyl, but preferably acetyl and as $C_3$–$C_5$alkenoyl is especially acryloyl.

$C_2$–$C_8$Alkenyl is, for example, allyl, methallyl, 2-butenyl, 2-pentenyl, 2-hexenyl or 2-octenyl.

$C_1$–$C_4$Alkyl substituted by a hydroxy, cyano, alkoxycarbonyl or carbamide group may be, for example, 2-hydroxyethyl, 2-hydroxypropyl, 2-Cyanoethyl, methoxycarbonylmethyl, 2-ethoxycarbonylethyl, 2-aminocarbonylpropyl or 2-(dimethylaminocarbonyl)-ethyl.

If any of the substituents are $C_2$–$C_{12}$alkylene, they are, for example, ethylene, propylene, 2,2-dimethylpropylene, tetramethylene, hexamethylene, octamethylene, decamethylene or dodecamethylene.

If any of the substituents are $C_6$–$C_{15}$arylene, they are, for example, o-, m- or p-phenylene, 1,4-naphthylene or 4,4'-diphenylene.

As $C_6$–$C_{12}$cycloalkylene special mention should be made of cyclohexylene.

$C_4$–$C_{22}$Acyloxyalkylene is, for example, 2-ethyl-2-acetoxymethylpropylene.

If any of the substituents are $C_2$–$C_6$alkoxyalkyl, they are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

Preferably the radicals $G_1$, $G_2$, $G_3$ and $G_4$ are methyl, and $G_5$ and $G_6$ are hydrogen.

It is also preferred that the radicals $G_1$ and $G_3$ are ethyl, $G_2$ and $G_4$ are methyl, $G_5$ is hydrogen and $G_6$ is methyl.

The group X is preferably selected from the group consisting of —C(=O)—$C_1$–$C_{38}$alkyl, —C(=O)—$C_1$–$C_{19}$alkenyl, —C(=O)—$C_6$–$C_{10}$aryl, —C(=O)—O—$C_1$–$C_6$alkyl, —C(=O)—O—$C_6$–$C_{10}$aryl, —C(=O)—NH—$C_1$–$C_6$alkyl, —C(=O)—NH—$C_6$–$C_{10}$aryl, —C(=O)—N($C_1$–$C_6$alkyl)$_2$, —P=O(—$C_1$–$C_{19}$alkyl)$_2$, —P=O(—$C_6$–$C_{10}$aryl)$_2$, —P=O(—O—$C_1$–$C_6$alkyl)$_2$, —P=O(—O—$C_6$–$C_{10}$aryl)$_2$, —P(—O—$C_1$–$C_6$alkyl)$_2$, —P(—O—$C_6$–$C_{10}$aryl)$_2$, $C_1$–$C_{18}$alkyl, $C_3$–$C_{18}$alkenyl, $C_3$–$C_{18}$alkynyl, phenyl, phenyl($C_7$–$C_{11}$)alkyl, phenyl or phenyl($C_7$–$C_{11}$)alkyl substituted by $C_1$–$C_{12}$alkyl, $C_1$–$C_{12}$alkoxy, OH, amino, $C_1$–$C_{12}$alkylamino, $C_1$–$C_{12}$dialkylamino, NO$_2$ or by halogen, $C_3$–$C_7$cycloalkyl, and a group

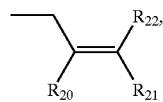

wherein
$R_{20}$, $R_{21}$ and $R_{22}$ are hydrogen, $C_1$–$C_{12}$alkyl, $C_2$–$C_{12}$alkenyl, phenyl or $C_3$–$C_7$cycloalkyl.

X is very especially selected from the group consisting of $C_1$–$C_{18}$alkyl, benzyl, allyl, cyclopentyl, cyclohexyl, —C(=O)—$C_1$–$C_{38}$alkyl, —C(=O)—$C_1$–$C_{19}$alkenyl, —C(=O)—$C_6$–$C_{10}$aryl.

Special preference is given to compounds of the structural formula A, B, O or P wherein m is 1,
R is hydrogen, $C_1$–$C_{18}$alkyl uninterrupted or interrupted by one or more oxygen atoms, cyanoethyl, benzyl, glycidyl, a monovalent radical of an aliphatic carboxylic acid having from 2 to 18 carbon atoms, of a cycloaliphatic carboxylic acid having from 7 to 15 carbon atoms, of an α,β-unsaturated carboxylic acid having from 3 to 5 carbon atoms or of an aromatic carboxylic acid having from 7 to 15 carbon atoms;
p is 1;
$R_1$ is $C_1$–$C_{12}$alkyl, $C_5$–$C_7$cycloalkyl, $C_7C_8$aralkyl, $C_2$–$C_{18}$alkanoyl, $C_3$–$C_5$alkenoyl or benzoyl;
$R_2$ is $C_1$–$C_{18}$alkyl, $C_5$–$C_7$cycloalkyl, $C_2$–$C_8$alkenyl, each unsubstituted or substituted by a cyano, carbonyl or carbamide group, or glycidyl, a group of formula —CH$_2$CH(OH)—Z or of formula —CO—Z— or —CONH—Z, wherein Z is hydrogen, methyl or phenyl.

Special preference is given to the compounds of structural formula A or B wherein m and p are 1, R is hydrogen, $C_1$–$C_{18}$alkyl, cyanoethyl, benzoyl, glycidyl, a monovalent radical of an aliphatic carboxylic acid having from 2 to 18 carbon atoms;
$R_1$ is $C_1$–$C_{12}$alkyl, $C_7$–$C_8$aralkyl, $C_2$–$C_{18}$alkanoyl, $C_3$–$C_5$alkenoyl or benzoyl;
$R_2$ is $C_1$–$C_{18}$alkyl, glycidyl, a group of formula —CH$_2$CH(OH)—Z or of formula —CO—Z, wherein
Z is hydrogen, methyl or phenyl; and
X is benzyl, allyl, cyclopentyl, cyclohexyl or —C(=O)—$C_1$–$C_{38}$alkyl.

As mentioned before the radicals $G_1$, $G_2$, $G_3$ and $G_4$ are preferably methyl, and $G_5$ and $G_6$ are hydrogen or the radicals $G_1$ and $G_3$ are ethyl, $G_2$ and $G_4$ are methyl, $G_5$ is hydrogen and $G_6$ is methyl for the aformentioned preferred subgroups.

The preparation of the above-mentioned compounds is known per se and can be carried out, for example, as described in U.S. Pat. Nos. 5,204,473, 5,300,647 or in GB 2335190.

Especially suitable specific individual compounds are:

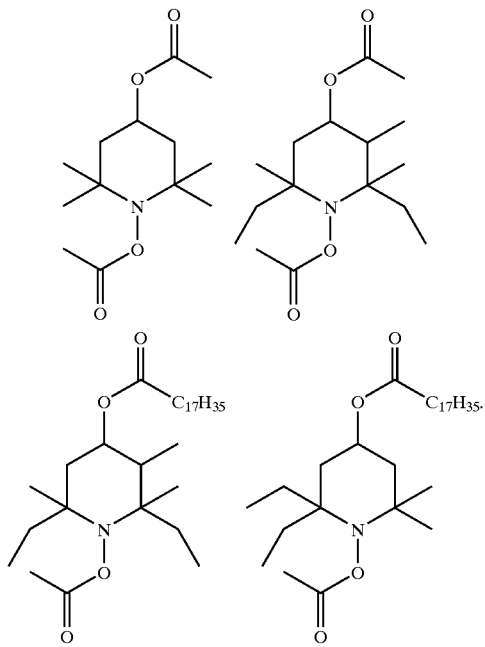

The compounds are known and can be prepared as described in U.S. Pat. No. 5,300,647 or in analogy thereto.

The preparation of suitable hydroxylaminesters is for example described in following U.S. Pat. Nos. 4,590,231, 5,300,647, 4,831,134, 5,204,473, 5,004,770, 5,096,950, 5,021,478, 5,118,736, 5,021,480, 5,015,683, 5,021,481, 5,019,613, 5,021,486, 5,021,483, 5,145,893, 5,286,865, 5,359,069, 4,983,737, 5,047,489, 5,077,340, 5,021,577, 5,189,086, 5,015,682, 5,015,678, 5,051,511, 5,140,081, 5,204,422, 5,026,750, 5,185,448, 5,180,829, 5,262,538, 5,371,125, 5,216,156, 5,300,544.

The alkoxyamine is preferably present in the composition in an amount of from 0.01 to 5% by weight, especially from 0.02 to 2% by weight, based on the polymer.

The polyfunctional compound having at least two unsaturated carbon bonds can be, for example, a poly-unsaturated hydrocarbon compound. Examples are isoprene and butadiene oligomers. The double bonds can be conjugated (diene type) or isolated double bonds (diolefin type).

They may be purely aliphatic or mixed aliphatic aromatic systems. Polyvinyl ethers, polyallyl ethers and polyallyl esters, for example, are very suitable. Typical examples are triallyl isocyanurate, triallyl cyanurate, divinyl benzene and diisopropylbenzene.

Also very suitable are allylated bisphenols or allylated biphenyls, for example of the following structural formulae

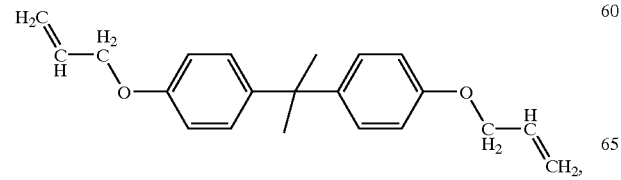

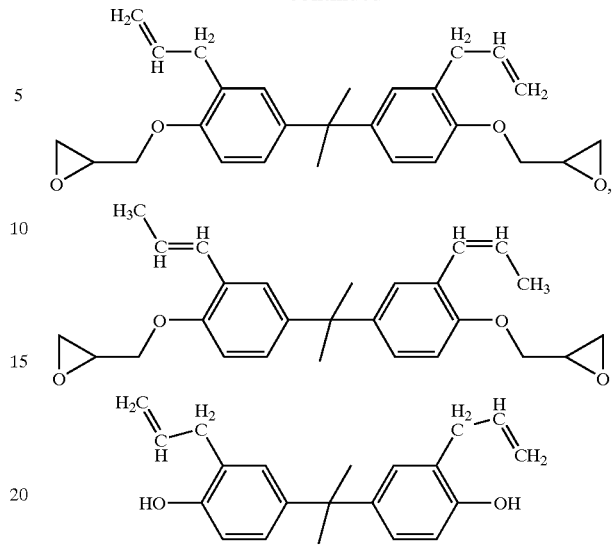

A further group of polyfunctional compounds having at least two unsaturated carbon bonds is derived from bis- or poly-maleimides.

They may be compounds of the following structural formula

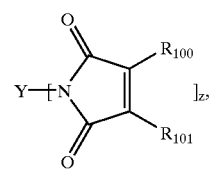

wherein z is a number from 2 to 6, $R_{100}$ and $R_{101}$ are each independently of the other hydrogen or $C_1$–$C_{18}$alkyl. Preferably both are hydrogen, Y is a z-valent radical and is $C_2$–$C_8$alkyl, phenylene, biphenylene or a radical

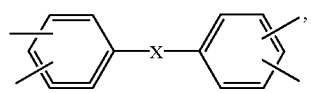

wherein X is =S, $SO_2$, $CH_2$ or $C(CH_3)_2$.

Typical examples are

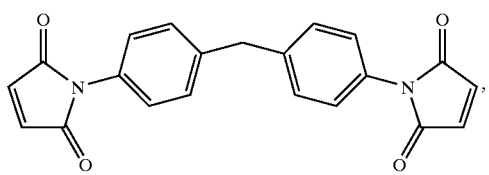

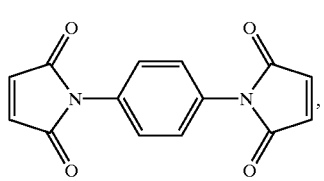

-continued

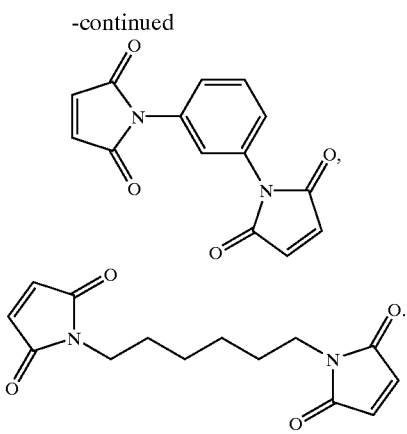

A further group of polyfunctional compounds having at least two unsaturated carbon bonds is derived from polyhydric alcohols that are esterified with an unsaturated $C_3$–$C_5$ acid or acetalised with unsaturated aldehydes. They are preferably acrylic or methacrylic acid or acrolein or furfural.

Typical examples are

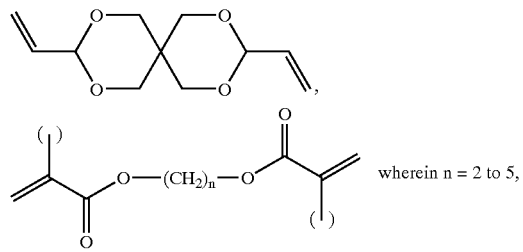

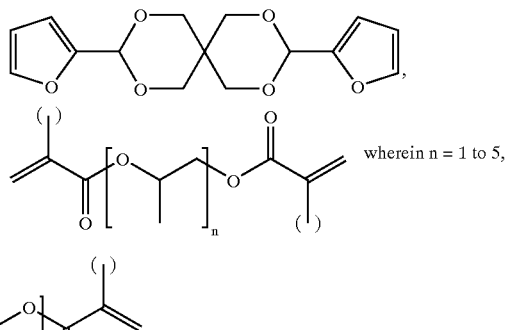

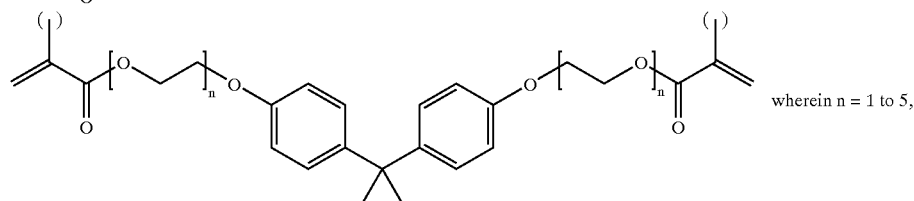 wherein n = 2 to 5, wherein n = 1 to 5,

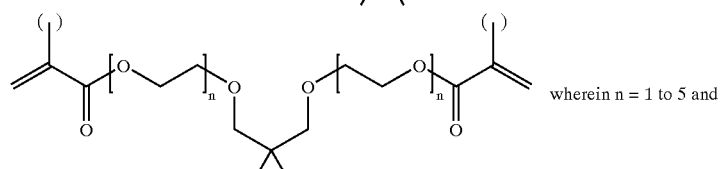 wherein n = 1 to 5,

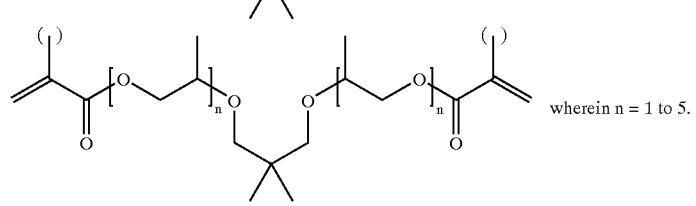 wherein n = 1 to 5 and wherein n = 1 to 5.

In the above structural formulae the group in parenthesis

is either hydrogen or methyl.

Examples of divalent alcohols are given below.

Suitable aliphatic diols are the linear and branched aliphatic glycols, especially those having from 2 to 12, more especially from 2 to 6, carbon atoms in the molecule, e.g. ethylene glycol, 1,2- and 1,3-propylene glycol, 1,2-, 1,3-, 2,3- or 1,4-butanediol, pentyl glycol, neopentyl glycol, 1,6-hexanediol, 1,12-dodecanediol. A suitable cycloaliphatic diol is e.g. 1,4-di-hydroxycyclohexane in cis or trans form or in the form of a cis/trans mixture. Further suitable aliphatic diols are e.g. 1,4-bis(hydroxymethyl) cyclohexane, aromatic-aliphatic diols, such as p-xylylene glycol or 2,5-dichloro-p-xylylene glycol, 2,2-(β-hydroxyethoxyphenyl)-propane and also polyoxyalkylene glycols, such as diethylene glycol, triethylene glycol or polyethylene glycol. The alkylenediols are preferably linear and contain especially from 2 to 4 carbon atoms.

Preferred diols are the alkylenediols, 1,4-dihydroxycyclohexane and 1,4-dihydroxymethyl-cyclohexane. Ethylene glycol and 1,4-butanediol are especially preferred.

Further suitable aliphatic diols are the β-hydroxyalkylated, especially β-hydroxyethylated bisphenols, such as 2,2-bis[4'-(β-hydroxyethoxy)-phenyl] propane. Further bisphenols are mentioned hereinbelow.

As aromatic diols there come into consideration mononuclear diphenols and especially dinuclear diphenols that carry a hydroxyl group on each aromatic nucleus. "Aromatic" is to be understood as being especially hydrocarbon-aromatic radicals, e.g. phenylene or naphthylene. In addition to e.g. hydroquinone, special mention may be made of bisphenols.

Examples of bisphenols are:
bis(p-hydroxyphenyl) ether or thioether, bis(p-hydroxyphenyl)sulfone, bis(p-hydroxyphenyl)-methane, bis (4-hydroxyphenyl)-2,2'-biphenyl, phenyl hydroquinone, 1,2-bis(p-hydroxyphenyl)ethane, 1-phenyl-bis(p-hydroxyphenyl)methane, diphenyl-bis(p-hydroxyphenyl)methane, diphenyl-bis(p-hydroxyphenyl)methane, diphenyl-bis(p-hydroxyphenyl)ethane, bis(3,5-dimethyl-4-hydroxyphenyl)sulfone, bis(3,5-dimethyl-4-hydroxyphenyl)-p-diisopropylbenzene, bis(3,5-dimethyl-4-hydroxyphenyl)-m-diisopropylbenzene, 2,2-bis(3',5'-dimethyl-4'-hydroxyphenyl)propane, 1,1- or 2,2-bis(p-hydroxyphenyl)butane, 2,2-bis(p-hydroxyphenyl)-hexafluoropropane, 1,1-dichloro- or 1,1,1-trichloro-2,2-bis (p-hydroxyphenyl)ethane, 1,1-bis-(p-hydroxyphenyl) cyclopentane and especially 2,2-bis(p-hydroxyphenyl) propane (bisphenol A), 1,1-bis(p-hydroxyphenyl) cyclohexane (bisphenol C) and 2,2-bis(p-hydroxyphenyl)-methane (bisphenol F).

Suitable tri- and tetra-hydric alcohols are, for example, trimethylolpropane, ditrimethylolpropane, pentaerythritol and dipentaerythritol.

Esterification with an unsaturated $C_3$–$C_5$ acid yields polyfunctional compounds. Typical examples that may be mentioned are

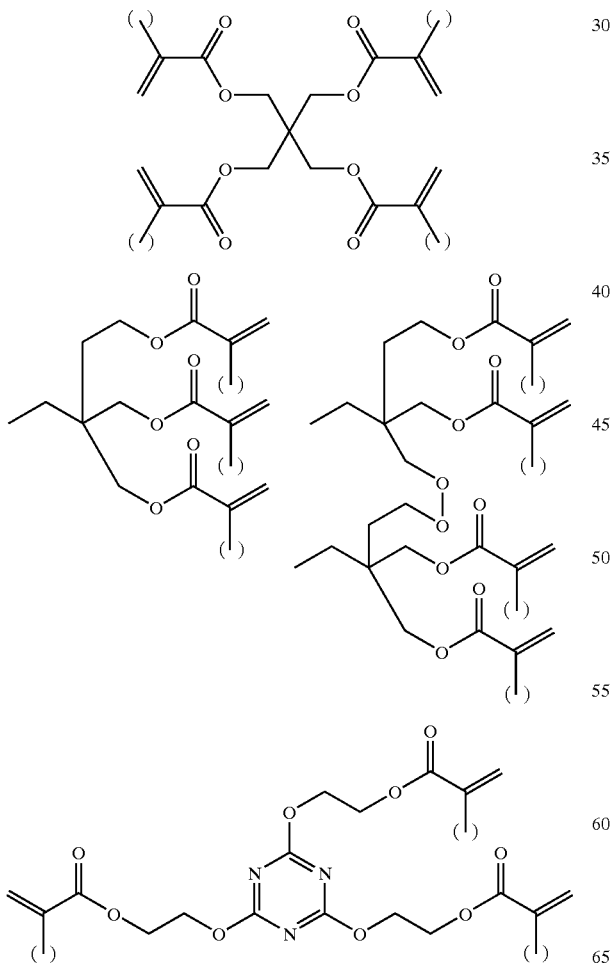

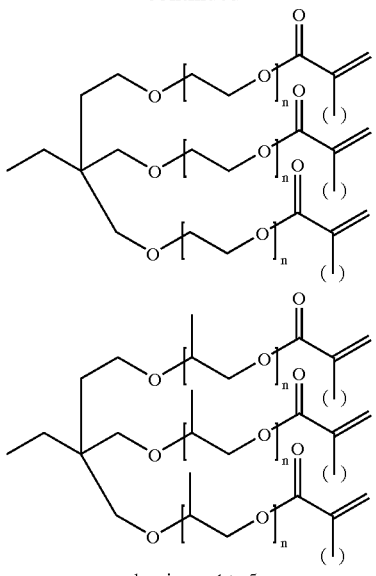

wherein n = 1 to 5

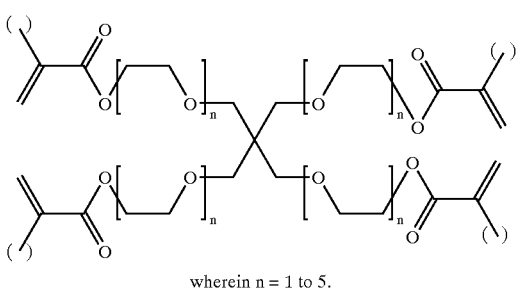

wherein n = 1 to 5.

In the above structural formulae, the group in parenthesis

is either hydrogen or methyl.

Esters having at least two unsaturated carbon bonds can also be derived from polycarboxylic acids, which are reacted, for example, with allyl alcohol.

Typical examples are

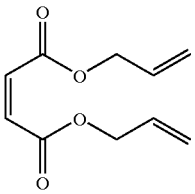

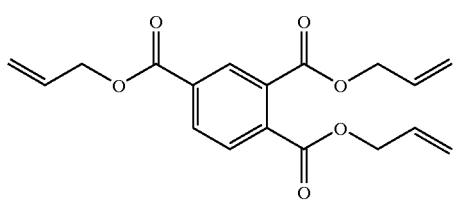

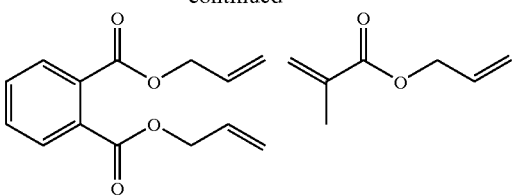

Examples of dicarboxylic acids are listed below.

Suitable dicarboxylic acids are linear and branched saturated aliphatic dicarboxylic acids, aromatic dicarboxylic acids and cycloaliphatic dicarboxylic acids.

As aliphatic dicarboxylic acids there come into consideration those having from 2 to 40 carbon atoms, e.g. suberic acid, oxalic acid, malonic acid, fumaric acid, maleic acid, dimethylmalonic acid, succinic acid, octadecylsuccinic acid, pimelic acid, adipic acid, trimethyladipic acid, sebacic acid, azelaic acid and dimer acids (dimerisation products of unsaturated aliphatic carboxylic acids, such as oleic acid), alkylated malonic and succinic acids, such as octadecylsuccinic acid.

Cycloaliphatic dicarboxylic acids that come into consideration are:
1,3-cyclobutanedicarboxylic acid, 1,3-cyclopentanedicarboxylic acid, 1,3- and 1,4-cyclohexanedicarboxylic acid, in cis or trans form or cis/trans mixtures, 1,3- and 1,4-(dicarboxylmethyl)-cyclohexane, 4,4'-dicyclohexyldicarboxylic acid.

Suitable aromatic dicarboxylic acids that come into consideration are:
especially terephthalic acid, isophthalic acid, o-phthalic acid, and also 1,3-, 1,4-, 2,6- or 2,7-naphthalenedicarboxylic acid, 4,4'-diphenyldicarboxylic acid, 4,4'-diphenylsulfonecarboxylic acid, 1,1,3-trimethyl-5-carboxyl-3-(p-carboxylphenyl)-indane, 4,4'-diphenyl ether dicarboxylic acid, bis-p-(carboxylphenyl)-methane, 4,4'-benzophenonedicarboxylic acid, bis-p-(carboxyl-phenyl) ethane.

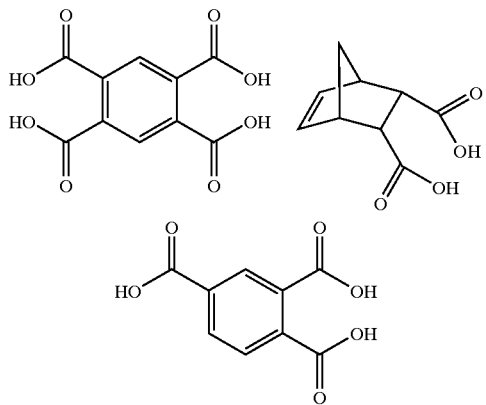

Preference is given to the aromatic dicarboxylic acids, and among them especially terephthalic acid and isophthalic acid, trimellitic acid and pyromellitic acid.

Preference is given to compositions wherein the polyfunctional compound having at least two unsaturated carbon bonds is a polyalkenyl compound, a polymaleimide, an ester of a polyhydric alcohol with an α,β-unsaturated $C_3$–$C_5$carboxylic acid, or an allyl ester of a polycarboxylic acid.

Examples of such polyfunctional compounds having at least two unsaturated carbon bonds are mentioned above.

The compounds are known to the person skilled in the art and most of them are commercially available.

Especially suitable specific polyfunctional compounds having at least two unsaturated carbon bonds are triallyl isocyanurate, triallyl cyanurate, 1,3-phenylenebismaleimide, 1,8-bismaleimido-3,6-dioxaoctane, trimethylolpropane tri(meth)acrylate, pentaerythritol tetra (meth)acrylate or the bismaleimide of 4,4'-diaminophenylmethane.

The polyfunctional compound having at least two unsaturated carbon bonds is preferably present in an amount of from 0.1 to 10% by weight, based on the polymer.

The polyfunctional compound having at least two unsaturated carbon bonds is preferably present in a ratio of from 10:1 to 1:5 relative to the alkoxyamine compound.

The above-mentioned polyfunctional compounds having at least two unsaturated carbon bonds are known and most of them are commercially available. Compounds that are not commercially available can be prepared in a simple manner in accordance with known methods using basic chemical reactions, such as esterification or condensation.

Using the present process, both controlled molecular weight increase and crosslinking are possible. The molecular weight increase/degree of crosslinking to be achieved is determined on the one hand by the amount of unsaturated carbon compound used and on the other hand by the amount of alkoxyamine compound used and is also dependent on the nature of the polymer used.

A high concentration of unsaturated carbon compound and/or alkoxyamine results primarily in crosslinking.

Low concentrations of unsaturated carbon compound and/or alkoxyamine result primarily in a molecular weight increase and in the retention of thermoplastic properties.

The use of a polymer of the polypropylene type in the process according to the invention achieves primarily a molecular weight increase, whereas polymers of the polyethylene type yield primarily crosslinked polymers.

In the case of copolymers and terpolymers or copolymer blends, high proportions of ethylene result in a polyethylene-like behaviour, whereas high proportions of propylene result in a polypropylene-like behaviour. When the afore-mentioned copolymers and terpolymers or copolymer blends have contents of poly-unsaturated olefins, then the greater the concentration of free double bonds, the greater the probability of crosslinking.

The process can be carried out in any heatable vessels equipped with a stirring device, preferably in closed apparatus with the exclusion of atmospheric oxygen, for example under an inert gas atmosphere ($N_2$), in a kneader, mixer or stirred vessel. It is also possible, however, to carry out the process in an extruder and also in the presence of air.

The addition to the polymer can be effected in any customary mixing apparatus in which the polymer is melted and mixed with the additives. Suitable apparatus is known to the person skilled in the art, such apparatus being predominantly mixers, kneaders and extruders.

The process is preferably carried out by making the addition during processing in an extruder.

Especially preferred processing apparatus includes single-screw extruders, double-screw extruders with screws rotating in the same or opposite directions, planetary roller extruders, ring extruders or co-kneaders. It is also possible to use processing machines which contain at least one degassing zone and which can be placed under reduced pressure.

Suitable extruders and kneaders are described inter alia in *Handbuch der Kunststoff-extrusion*, Vol. 1 Grundlagen, Eds.

F. Hensen, W. Knappe, H Potente, 1989, pages 3–7, ISBN:3-446-14339-4 (Vol. 2 Extrusionsanlagen 1986, ISBN 3-446-14329-7).

By way of example, the screw length is 1–60 times the screw diameter and preferably 35–48 times the screw diameter. The screw speed is preferably 10–600 revolutions per minute (rev/min) and more especially 25–300 rev/min.

The maximum throughput is dependent upon the screw diameter, speed and driving power. The process of the present invention can also be carried out at lower than the maximum throughput by varying the mentioned parameters or by operating with feed weighing devices.

If a plurality of components is added, these can be added premixed or individually.

The polymers are to be exposed to elevated temperature for a sufficient period of time for the desired build-up/crosslinking to occur. The temperature is above the softening temperature in the case of amorphous polymers or the melting temperature in the case of crystalline polymers.

The molecular weight increase/crosslinking can also be carried out after the preparation of the premix (compound). Examples thereof are thermoforming and rotomolding processes.

In a preferred embodiment of the process of the present invention, a temperature range of about from 140° C. to 300° C. is used. In an especially preferred process variant, the temperature range of about from 180° C. to 280° C. is used.

The period of time required for the build-up/crosslinking may vary according to temperature, amount of material to be built up and the nature of extruder which may be used. It is usually about from 10 s to 30 min, especially from 20 s to 10 min.

In a process for increasing molecular weight (crosslinking), the components can be added to the polymer to be built up singly or as mixtures.

Incorporation into the polymers can be carried out, for example, by mixing in the compounds described above or mixtures thereof and optionally further additives in accordance with methods customary in the art.

The incorporation can alternatively take place at temperatures that do not bring about any decomposition of the compounds according to the invention (latent compound). The polymers prepared in that manner can then be heated a second time and exposed to an elevated temperature for a sufficient period of time for the desired molecular weight increase/crosslinking to occur.

The compounds can also be added to the polymers to be built up in the form of a so-called masterbatch containing the components, for example in a concentration of about from 1 to 25% by weight. The masterbatch (concentrate) is preferably prepared at temperatures that do not bring about any decomposition of the alkoxyamine compounds according to the invention.

There is thus made available an easily metered product that can already be mixed (compounded) advantageously with other additives. The masterbatch can then be used at a temperature above the decomposition temperature of the alkoxyamine compounds in admixture with the polymer to be built up.

A further advantage of the present invention therefore lies in the possibility of producing a concentrate that contains the compounds according to the invention in a concentration range of from 1 to 25% by weight and that can be added to the polymer to be built up. The technically desirable product is thus obtainable in an advantageous two-step process.

The polymer to be heated and the mixture of functional compound b) and alkoxyamine a) are usually introduced into the apparatus at the start of heating, but subsequent feeding into the already preheated polyolefin is also possible, it being possible to add the mixture as such or to add the individual components in any order.

Heating above the melting point is generally carried out, with stirring, until a homogeneous distribution is obtained, the temperature being governed by the polymer used. In order to carry out the reaction, the operation is carried out in the range between the melting temperature (crystalline polymers) or softening temperature (amorphous polymers) and a temperature of about 10–150° C. above the melting/softening temperature.

Preferred processing temperatures that may be mentioned for polyolefins are for LDPE: 160–240° C., for HDPE 180–260° C., for PP 220–300° C. and for PP copolymers 180–280° C.

The invention relates also to a composition comprising a) a non-halogen-containing thermoplastic polymer;
b) a functional compound having at least two unsaturated carbon bonds; and
c) an alkoxyamine having a structural unit

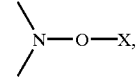

which forms free radicals at the melting temperature/processing temperature.

The invention relates likewise to the use of a composition comprising a) a functional compound having at least two unsaturated carbon bonds; and
b) an alkoxyamine having a structural unit

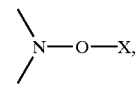

which forms free radicals at the melting temperature/processing temperature of the polymer, for increasing the molecular weight of non-halogen-containing polymers.

The above comments and preferences apply also to the composition and use.

The present invention relates also to polymers obtainable in accordance with the process mentioned above.

In some cases it may be advantageous additionally to add free-radical formers in order to accelerate the crosslinking. Examples of free-radical formers are known to the person skilled in the art and are commercially available. Examples are:

2,2'-azo-bis(2-methyl-butyronitrile)=AIBN, 2,2'-azo-bis(2,4-dimethylvaleronitrile), 2,2'-azo-bis(4-methoxy-2,4-dimethylvaleronitrile), 1,1'-azo-bis(1-cyclohexane-carbonitrile), 2,2'-azo-bis(isobutyramide) dihydrate, 2-phenylazo-2,4-dimethyl-4-methoxyvaleronitrile, dimethyl-2,2'-azo-bisisobutyrate, 2-(carbamoylazo)isobutyronitrile, 2,2'-azo-bis(2,4,4-trimethylpentane), 2,2'-azo-bis(2-methylpropane), 2,2'-azo-bis(N,N'-dimethyleneisobutyramidine) as free base or as hydrochloride, 2,2'-azo-bis(2-amidinopropane) as free base or as hydrochloride, 2,2'-azo-bis{2-methyl-N-[1,1-bis(hydroxymethyl)ethyl]propionamide} or 2,2'-azo-bis{2-methyl-N-[1,1-bis(hydroxymethyl)-2-hydroxyethyl]propionamide.

Acetyl-cyclohexanesulfonyl peroxide, diisopropyl peroxydicarbonate, tert-amyl perneodecanoate, tert-butyl perneodecanoate, tert-butyl perpivalate, tert-amyl perpivalate, di(2,4-dichlorobenzoyl)peroxide, diisononanoyl peroxide, didecanoyl peroxide, dioctanoyl peroxide, dilauroyl peroxide, di(4-methyl-benzoyl) peroxide, disuccinic acid peroxide, diacetyl peroxide, dibenzoyl peroxide=BPO, tert-butyl per-2-ethylhexanoate, di(4-chlorobenzoyl) peroxide, tert-butyl perisobutyrate, tert-butyl permaleate, 1,1-bis(tert-butylperoxy)-3,5,5-trimethylcyclohexane, 1,1-bis(tert-butylperoxy) cyclohexane, tert-butyl-peroxyisopropyl carbonate, tert-butyl perisononanoate, 2,5-dimethylhexane-2,5-dibenzoate, tert-butyl peracetate, tert-amyl perbenzoate, tert-butyl perbenzoate, diisopropyl peroxydicarbonate, bis(4-tert-butylcyclohexyl)-peroxydicarbonate, 2,2-bis(tert-butylperoxy)butane, 2,2-bis(tert-butylperoxy)propane, dicumyl peroxide=DCP, 2,5-dimethylhexane-2,5-di-tert-butyl peroxide, 3-tert-butylperoxy-3-phenyl phthalide, di-tert-amyl peroxide, 1,3-bis(tert-butylperoxy-isopropyl) benzene, 3,5-bis(tert-butylperoxy)-3,5-dimethyl-,2-dioxolane, di-tert-butyl peroxide, 2,5-dimethylhexyne-2,5-di-tert-butylperoxide, n-butyl-4,4-di(tert-butylperoxy) valerate, ethyl-3,3-di(tert-butylperoxy)butyrate, di(1-hydroxycyclohexyl) peroxide, dibenzyl peroxide, tert-butyl-cumyl peroxide, 3,3,6,6,9,9-hexamethyl-1,2,4,5-tetraoxacyclononane, p-menthane hydroperoxide, pinane hydroperoxide, diisopropylbenzene monohydroperoxide, cumene hydroperoxide, methyl ethyl ketone peroxide or tert-butyl hydroperoxide.

Mention should also be made of commercially available 'C free-radical formers' such as, for example: 2,3-dimethyl-2,3-diphenylbutane, 3,4-dimethyl-3,4-diphenylhexane or poly-1,4-diisopropylbenzene.

It is also possible to use combinations of those free-radical formers.

In addition to the components mentioned above, it is also possible for further additives to be present in the polymer composition, such additives being fillers, processing auxiliaries, heat stabilisers and light stabilisers. Examples are mentioned below.

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl4-hydroxyphenyl)-disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy2-methylphenyl)-4-n-dodecylmercapto-butane, 1,1,5,5-tetra(5-tert-butyl-4-hydroxy-2-methylphenyl)pentane.

1.7, O—, N— and S-benzyl compounds, for example 3,5, 3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl) malonate, di-octadecyl-2-(3-tert-butyl-4-hydroxy-5-methylbenzyl)malonate, didodecylmercaptoethyl-2,2-bis(3, 5-di-tert-butyl-4-hydroxybenzyl)malonate, bis[4-(1,1,3,3-tetramethylbutyl)phenyl]-2,2-bis(3,5-di-tert-butyl4-hydroxybenzyl)malonate.

1.9. Aromatic hydroxybenzyl compounds, for example 1,3, 5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis (octylmercapto)-6-(3,5-di-tert-butyl-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3, 5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tertbutyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl4-hydroxy-5-methylphenyl)propionyloxy)-1,1-dimethylethyl]-2,4,8,10-tetraoxaspiro[5.5]-undecane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3.5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetra-methylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV absorbers and light stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenylbenzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyl-oxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl) phenyl]-benzotriazole; 2-[2'-hydroxy-3'-(1,1,3,3tetramethylbutyl)-5'-(α,α-dimethylbenzyl)phenyl] benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-pipenidyl) sebacate, bis(1,2,2,6,6-pentamethyl-4-piperidyl) n-butyl-3, 5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl4-piperidyl)-1, 2,3,4-butanetetracarboxylate, 1,1'-(1,2-ethanediyl)-bis(3,3, 5,5-tetramethylpiperazinone), 4-benzoyl-2,2,6,6-tetramethylpiperidine, 4-stearyloxy-2,2,6,6-tetramethyl piperidine, bis(1,2,2,6,6-pentamethylpiperidyl)-2-n-butyl-2-(2-hydroxy-3,5-di-tert-butylbenzyl)-malonate, 3-n-octyl-7, 7,9,9-tetramethyl-1,3,8-triazaspiro[4.5]decane-2,4-dione, bis(1-octyl-oxy-2,2,6,6-tetramethylpiperidyl)sebacate, bis (1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis (4-n-butylamino-2,2,6,6-tetramethylpiperidyl)-1,3,5-triazine and 1,2-bis(3-aminopropylamino)-ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4,5]decane-2,4-dione, 3-dodecyl-1-(2,2,6,6-tetramethyl-4-piperidyl)pyrrolidine-2, 5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl) hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2, 2,6,6-tetramethyl-4-piperidyl)-n-dodecylsuccinimide, N-(1, 2,2,6,6-pentamethyl4-piperidyl)-n-dodecylsuccinimide, 2-undecyl-7,7,9,9-tetramethyl-1-oxa-3,8-diaza-4-oxo-spiro [4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl) hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanlide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4, 6-tris(2-hydroxy-4-octyloxyphenyl)-1,3,5-triazine, 2-(2-hydroxy-4-octyloxyphenyl)-4,6-bis(2,4-dimethylphenyl)-1, 3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy) phenyl]-4,6-bis(2,4-dimethyl)-1,3,5-triazine, 2-(2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-(2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl)hydrazine, 3-salicyloylamino-1,2,4-triazole, bis (benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,4-dicumylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos®168, Ciba-Geigy), tris(nonylphenyl) phosphite,

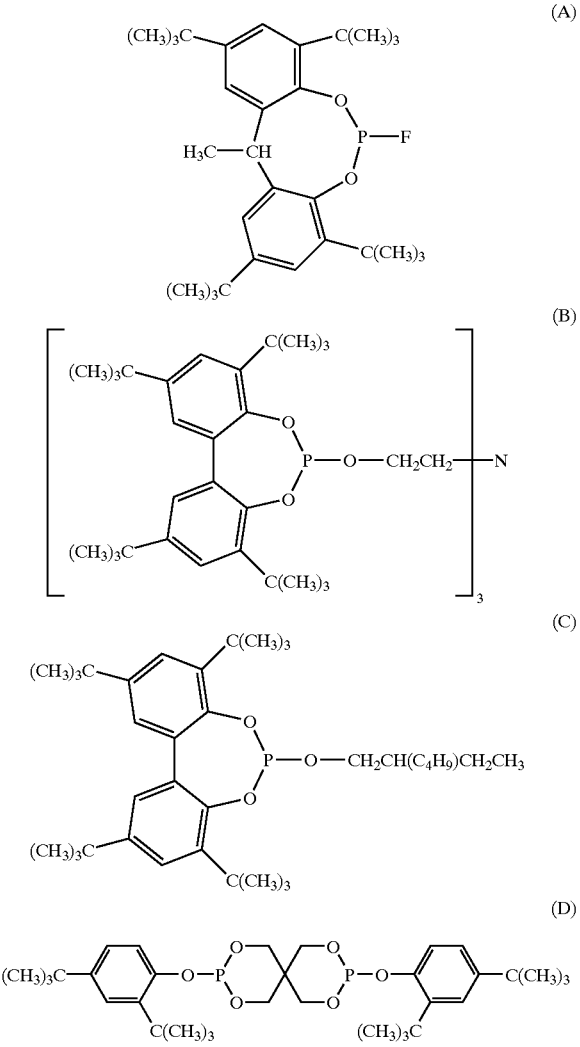

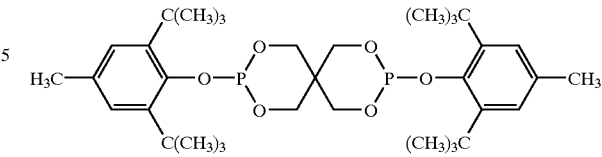

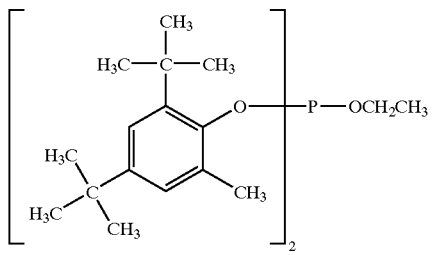

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example copper salts in combination with iodides and/or phosphorus compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g.

4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene) sorbitol, 1,3:2,4-di(paramethyldibenzylidene)sorbitol, and 1,3:2,4-di(benzylidene)sorbitol.

12. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

In a specific embodiment of the invention selected antioxidants, processing additives are additionally present Particularly preferred are the following compounds:

Pentaerythrit-tetrakis(3-(3,5-di-tert-butyl-4-hydroxyphenyl)-propionate) (IRGANOX® 1010), octadecyl-3-(3,5-di-tert-butyl-4-hydroxyphenyl)-propionate) (IRGANOX® 1076), 3,3',3',5,5',5'-hexa-tert-butyl-α,α',α'-(mesitylen-2,4,6-triyl) tri-p-cresol (IRGANOX® 1330), calcium-diethyl-bis(((3,5-bis(1,1-dimethylethyl)-4-hydroxyphenyl)methyl) phosphonate) (IRGANOX® 1425), 1,3,5-tris(3,5-di-tert-butyl-4-hydroxybenzyl)-1,3,5-triazin-2,4,6(1H,3H,5H)-trion (IRGANOX® 3114);

tris(2,4-di-tert-butylphenyl)-phosphite (Irgafos® 168), tris (nonylphenyl)-phosphite, tetrakis(2,4-di-tert-butyphenyl) [1,1-biphenyl]-4,4'-diylbisphosphonite (IRGANOX® P-EPQ), didodecyl-3,3'-thiodipropionate (IRGANOX® PS 800), dioctadecyl-3,3'-thiodipropionate (IRGANOX® PS 802);

5,7-di-tert-butyl-3-(3,4-dimetylphenyl)-3H-benzofurane-2-on (IRGANOX® HP 136).

The following Examples illustrate the invention.

Molecular Weight Increase of Polyethylene

In a double-screw extruder (ZSK 25 from Werner & Pfleiderer) with screws rotating in the same direction, a commercially available polyethylene (Hostalen GM 8255, manufacturer: Hostalen Polyethylen GmbH, MFR 190/21.6=7.7, density (at 190° C.)=0.77) is extruded at a temperature of $T_{max}$=250° C. (heating zone 1–6) and 100 rev/min with the addition of the additives listed in Table 1 and pelletised. The granules are then injection-moulded to form test specimens (240° C.) and the tensile strength and elongation at break are tested in a tensile test.

TABLE 1

Molecular weight increase of polyethylene

| | Additive | MFR [190/21.6]* | Tensile strength [N/mm²]** |
|---|---|---|---|
| Examples according to the invention A1 | 0.5% triallyl triazinetrione + 0.05% NOR-1 | 6.2 | 41.6 |
| A2 | 0.5% triallyl triazinetrione + 0.25% NOR 1 | 3.0 | 37.0 |
| A3 | 0.5% Matrimid ® 5292A + 0.5% NOR-1 | 0.33 | 35.5 |
| Comparative Examples V1 | without additives | 8.10 | 34.4 |
| V2 | 0.5% triallyl triazinetrione | 7.9 | 37.2 |
| V3 | 1.0% triallyl triazinetrione | 8.3 | 35.5 |
| V4 | 0.5% Matrimid ® 5292A | 3.8 | 35.0 |
| V5 | 1.0% Matrimid ® 5292A | 3.5 | 34.1 |

*MFR according to ISO 1133
**measured using a tensile impact bar (tensile impact bar according to DIN 53448)
NOR 1: hexanedioic acid bis(1-cyclohexyloxy-2,2,6,6-tetramethyl-piperidin-4-yl) ester (prepared according to U.S. Pat. No. 5,204,473)
Matrimid ® 5292A: 4,4'-bismaleimido-diphenylmethane (commercial product of Vantico, formerly Ciba SC Polymer Division)

Unlike the Comparison Examples, in the Examples according to the invention there is a substantial molecular weight increase, which is expressed in a lowering of the MFR value.

Molecular Weight Increase of Polypropylene

In a double-screw extruder (TW 100 from Haake) with screws rotating in opposite directions, a commercially available polypropylene (Hostalen PPN 1060, manufacturer: Targor, MFR 230/2.16=2.4, density=0.81) is extruded at a temperature of $T_{max}$=230° C. (heating zone 1–5) at 40 rev/min with the additives listed in Table 2 and pelletised. The MFR is determined according to ISO 1133.

TABLE 2

Molecular weight increase of polypropylene

| | Additives | MFR [230/2.16]* |
|---|---|---|
| Example according to the invention B1 | 0.5% pentaerythritol tetraacrylate + 0.5% NOR 2 | 1.42 |
| Comparison Example V6 | without additives | 3.25 |

*MFR according to ISO 1133
NOR 2: oligomer of N,N'-bis(1-allyloxy-2,2,6,6-tetramethyl-piperidin-4-yl) hexane-1,6-diamine with(1-allyloxy-2,2,6,6-tetramethyl-piperidin-4-yl)-butyl-(4,6-dichloro[1,3,5]triazin-2-yl)-amine, (prepared analogously to U.S. Pat. No. 5,204,473)

Unlike the Comparison Examples, in the Example according to the invention there is a substantial molecular weight increase, which is expressed in a lowering of the MFR value.

Molecular Weight Increase of HDPE

In a double-screw extruder (ZSK 25 from Werner & Pfleiderer) with screws rotating in the same direction, commercially available polyethylene (Hostalen GB7250, manufacturer: Hoechst) is extruded at a temperature of $T_{max}$=270° C. (heating zone 1–6), a throughput of 4 kg/h and 100 rev/min with the addition of the additives indicated and pelletised in a water bath, and the melt viscosity (MFR) is determined according to ISO 1133. The granules are then injection-moulded (Arburg 320S) at a temperature of 230° C. to form test specimens and the tensile impact strength, the tensile strength and the elongation at break are determined.

Unlike the Comparison Example, in the Examples according to the invention there is a substantial molecular weight increase, which is expressed in a lowering of the MFR values and in higher mechanical strengths.

TABLE 3

Molecular weight increase of HDPE

|  | Additive | MFR [190/21.6]* | Tensile impact strength [kJ/m²] | Tensile strength [N/mm²]** |
|---|---|---|---|---|
| Comparison Example V7 | without additives | 7.2 | 299 | 23.5 |
| Examples according to the invention C1 | 0.3% pentaerythritol tetraacrylate + 0.05% Flamestab NOR116 | 0.87 | 346 | 26.1 |
| C2 | 0.3% pentaerythritol tetraacrylate + 0.05% NOR 3 | 0.57 | 362 | 25.8 |
| C3 | 0.3% pentaerythritol tetraacrylate + 0.1% NOR 3 | 0.54 | 368 | 26.2 |
| C4 | 0.3% tris(hydroxymethyl)-propane triacrylate + 0.1% NOR 3 | 1.9 | 367 | 25.8 |
| C5 | 2% Hycar ATB 2000 × 173 + 0.05% NOR 3 | 8.1 | 285 | 22.6 |
| C6 | 2% Hycar ATB 2000 × 173 + 0.1% NOR 3 | 7.0 | 226 | 23 |
| C7 | 2% Hycar ATB 2000 × 173 + 0.3% pentaerythritol tetraacrylate + 0.05% NOR 3 | 5.4 | 283 | 23.1 |

*MFR according to ISO 1133
**measured using a tensile impact bar (tensile impact bar according to DIN 53448)
Flamestab ® NOR116: reaction product of N,N'-ethane-1,2-diylbis(1,3-propanediamine), cyclohexane peroxidized 4-butylamino-2,2,6,6-tetramethylpiperidine and 2,4,6-trichloro-1,3,5-triazine (commercial product Ciba SC)
NOR 3: 4-acetoxy-2,2,6,6-tetramethyl-piperidin-1-yl acetic acid ester (prepared according to U.S. Pat. No. 5,300,647)

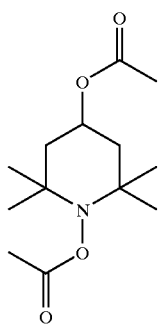

Hycar® ATB 2000×173: amine-terminated polybutadiene (commercial product BF Goodrich)

What is claimed is:

1. A process for the molecular weight increase/ crosslinking of non-halogen-containing thermoplastic polymers, in which process a composition comprising a) a non-halogen-containing thermoplastic polymer;

b) a functional compound having at least two unsaturated carbon bonds which is a polyalkenyl compound, a polymaleimide, an ester of a polyhydric alcohol with an α,β-unsaturated $C_3$–$C_5$carboxylic acid, or an allyl ester of a polycarboxylic acid;

and c) an alkoxyamine having a structural unit

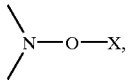

which forms free radicals at the melting temperature/ processing temperature of the polymer, is mixed and heated above the melting point of the polymer in the case of crystalline polymers or the softening point in the case of amorphous polymers, wherein X is selected from the group consisting of —C(=O)—$C_1$–$C_{38}$alkyl, —C(=O)—$C_1$–$C_{19}$alkenyl, —C(=O)—$C_6$–$C_{10}$aryl, —C(=O)—O—$C_1$–$C_6$alkyl, —C(=O)—O—$C_6$–$C_{10}$aryl, —C(=O)—NH—$C_1$–$C_6$alkyl, —C(=O)—NH—$C_6$–$C_{10}$aryl, —C(=O)—N($C_1$–$C_6$alkyl)$_2$, —P=O(—$C_1$–$C_{19}$alkyl)$_2$, —P=O(—$C_6$–$C_{10}$aryl)$_2$, —P(—O—$C_1$–$C_6$alkyl)$_2$, —P=O(—O—$C_6$–$C_{10}$aryl)$_2$, —P=O(—O—$C_1$–$C_6$alkyl)$_2$, —P(—O—$C_6$–$C_{10}$aryl)$_2$, $C_1$–$C_{18}$alkyl, $C_3$–$C_{18}$alkenyl, $C_3$–$C_{18}$alkynyl, phenyl, phenyl($C_7$–$C_{11}$)alkyl, phenyl or phenyl($C_7$–$C_{11}$)alkyl substituted by $C_1$–$C_{12}$alkyl, $C_1$–$C_{12}$alkoxy, OH, amino, $C_1$–$C_{12}$alkylamino, $C_1$–$C_{12}$dialkylamino, $NO_2$ or by halogen, $C_3$–$C_7$cycloalkyl, and a group

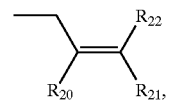

wherein $R_{20}$, $R_{21}$ and $R_{22}$ are hydrogen, $C_1$–$C_{12}$alkyl, $C_2$–$C_{12}$alkenyl, phenyl or $C_3$–$C_7$cycloalkyl.

2. A process according to claim 1, wherein the operation is carried out at a temperature of from 140° C. to 300° C.

3. A process according to claim 1, wherein the thermoplastic polymer is a polyolefin or polystyrene.

4. A process according to claim 3, wherein the polyolefin is polyethylene or polypropylene.

5. A process according to claim 1, wherein the alkoxyamine is a cyclic amine and contains a structural unit of formula (I)

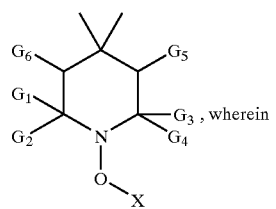
(I)

, wherein $G_1$, $G_2$, $G_3$, $G_4$ are independently $C_1$–$C_6$alkyl or $G_1$ and $G_2$ or $G_3$ and $G_4$, or $G_1$ and $G_2$ and $G_3$ and $G_4$ together with the carbon atom to which they are bonded form a $C_5$–$C_{12}$cycloalkyl group; and $G_5$ and $G_6$ are each independently of the other H, $C_1$–$C_{18}$alkyl, phenyl, naphthyl or a group $COOC_1$–$C_{18}$alkyl.

6. A process according to claim 5, wherein the structural unit of formula (I) is one of the structural formulae A to S

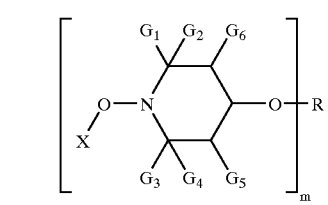
(A)

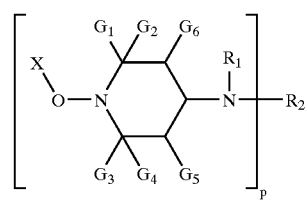
(B)

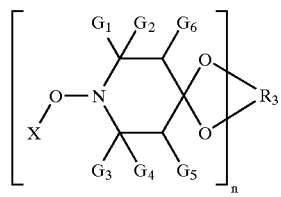
(C)

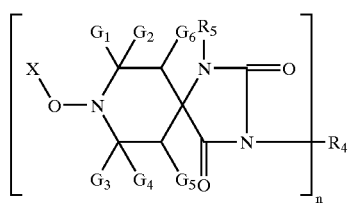
(D)

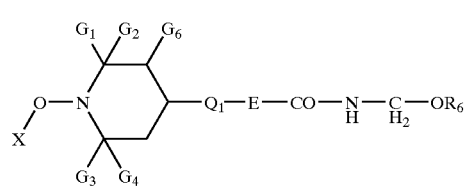
(E)

-continued

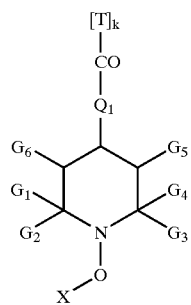
(F)

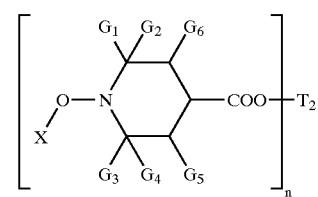
(G)

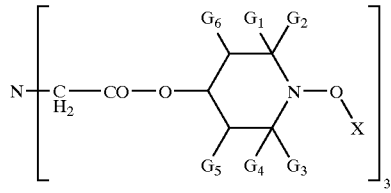
(H)

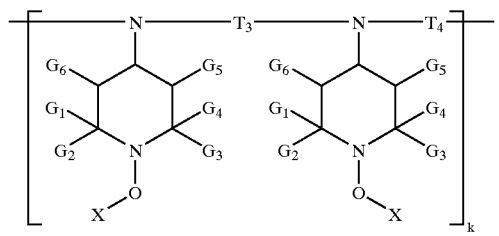
(I)

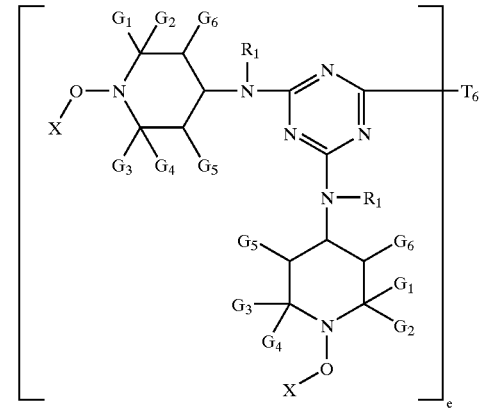
(K)

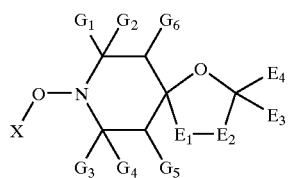
(L)

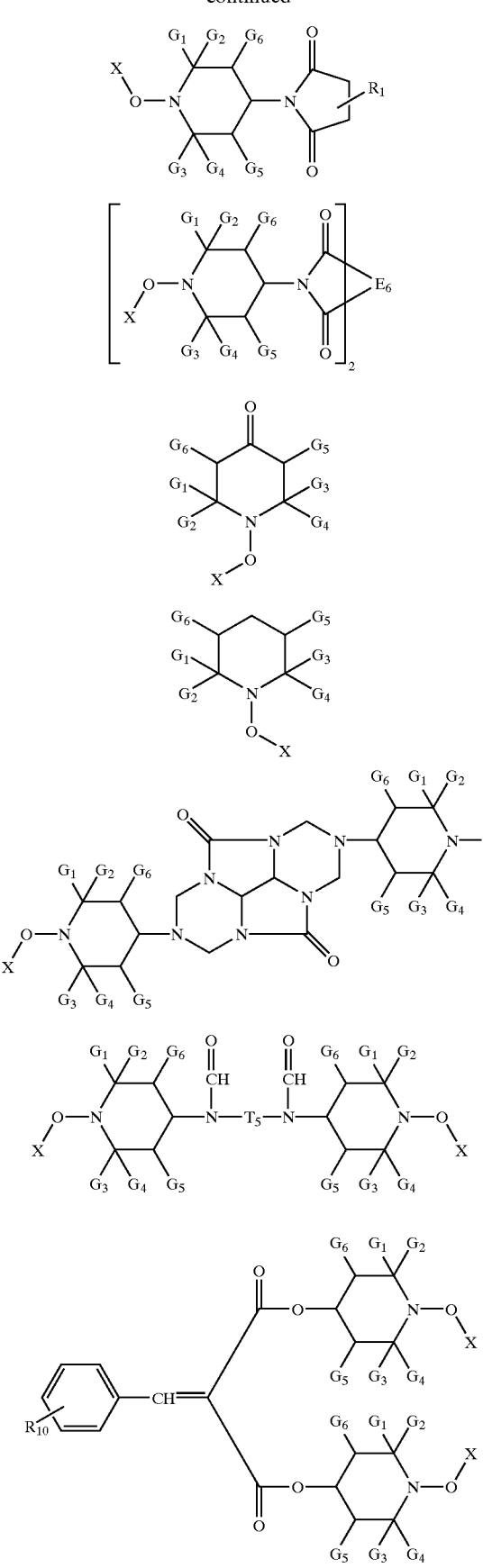

wherein

G₁, G₂, G₃ and G₄ are independently $C_1-C_4$alkyl or G₁ and G₂ together and G₃ and G₄ together, or G₁ and G₂ together or G₃ and G₄ together are pentamethylene; and G₅ and G₆ are each independently of the other hydrogen or $C_1-C_4$alkyl;

m is a number from 1 to 4;

when m is 1,

R is hydrogen, $C_1-C_{18}$alkyl uninterrupted or interrupted by one or more oxygen atoms, cyanoethyl, benzyl, glycidyl, a monovalent radical of an aliphatic carboxylic acid having from 2 to 18 carbon atoms, of a cycloaliphatic carboxylic acid having from 7 to 15 carbon atoms, of an α,β-unsaturated carboxylic acid having from 3 to 5 carbon atoms or of an aromatic carboxylic acid having from 7 to 15 carbon atoms, of a carbamic acid or of a phosphorus-containing acid or is a monovalent silyl radical, it being possible in each case for the carboxylic acid to be substituted in the aliphatic, cycloaliphatic or aromatic moiety by 1 to 3 —$COOZ_{12}$ groups, wherein $Z_{12}$ is hydrogen, $C_1-C_{20}$alkyl, $C_3-C_{12}$alkenyl, $C_5-C_7$cycloalkyl, phenyl or benzyl;

when m is 2,

R is $C_2-C_{12}$alkylene, $C_4-C_{12}$alkenylene, xylylene, a divalent radical of an aliphatic dicarboxylic acid having from 2 to 36 carbon atoms, of a cycloaliphatic or aromatic dicarboxylic acid having from 8 to 14 carbon atoms or of an aliphatic, cycloaliphatic or aromatic dicarbamic acid having from 8 to 14 carbon atoms, it being possible in each case for the dicarboxylic acid to be substituted in the aliphatic, cycloaliphatic or aromatic moiety by 1 or 2 —$COOZ_{12}$ groups;

when m is 3,

R is a trivalent radical of an aliphatic, cycloaliphatic or aromatic tricarboxylic acid which may be substituted in the aliphatic, cycloaliphatic or aromatic moiety by —$COOZ_{12}$, of an aromatic tricarbamic acid or of a phosphorus-containing acid or is a trivalent silyl radical;

when m is 4,

R is a tetravalent radical of an aliphatic, cycloaliphatic or aromatic tetracarboxylic acid;

p is 1, 2 or 3, $R_1$ is $C_1-C_{12}$alkyl, $C_5-C_7$cycloalkyl, $C_7-C_8$aralkyl, $C_2-C_{18}$alkanoyl, $C_3-C_5$alkenoyl or benzoyl;

when p is 1, $R_2$ is $C_1-C_{18}$alkyl, $C_5-C_7$cycloalkyl, $C_3-C_8$alkenyl, each unsubstituted or substituted by a cyano, carbonyl or carbamide group, or glycidyl, a group of formula —CH₂CH(OH)—Z or of formula —CO—Z— or —CONH—Z, wherein Z is hydrogen, methyl or phenyl; or when p is 1, $R_1$ and $R_2$ together may also be a cyclic acyl radical of an aliphatic or aromatic 1,2- or 1,3-dicarboxylic acid;

when p is 2, $R_2$ is $C_2-C_{12}$alkylene, $C_6-C_{12}$arylene, xylylene, a group —CH₂CH(OH)CH₂—O—B—O—CH₂CH(OH)CH₂—, wherein B is $C_2-C_{10}$alkylene, $C_6-C_{15}$arylene or $C_6-C_{12}$cycloalkylene; or, when $R_1$ is not alkanoyl, alkenoyl or benzoyl, $R_2$ may also be a divalent acyl radical of an aliphatic, cycloaliphatic or aromatic dicarboxylic acid or carbamic acid or is the group —CO—; or $R_2$ is a group

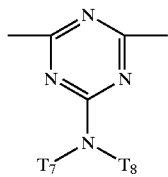

wherein $T_7$ and $T_8$ are each independently of the other hydrogen, $C_1$–$C_{18}$alkyl, or $T_7$ and $T_8$ together are $C_4$–$C_8$alkylene or 3-oxapentamethylene;

when p is 3, $R_2$ is 2,4,6-triazinyl;

when n is 1, $R_3$ is $C_2$–$C_8$alkylene or hydroxyalkylene or $C_4$–$C_{22}$acyloxyalkylene; or when n is 2,

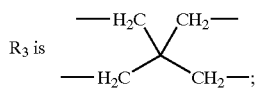

when n is 1, $R_4$ is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$alkoxyalkyl, $C_6$–$C_{10}$aryl, glycidyl, a group of formula —$(CH_2)_{m'}$—COO—Q or of formula —$(CH_2)_{m'}$—O—CO—Q, wherein m' is 1 or 2 and Q is $C_1$–$C_4$alkyl or phenyl; or when n is 2, $R_4$ is $C_2$–$C_{12}$alkylene, $C_6$–$C_{12}$arylene, a group —$CH_2CH(OH)CH_2$—O—D—O—$CH_2CH(OH)CH_2$—, wherein D is $C_2$–$C_{10}$alkylene, $C_6$–$C_{15}$arylene or $C_6$–$C_{12}$cycloalkylene, or a group —$CH_2CH(OZ_1)CH_2$—$(OCH_2CH(OZ_1)CH_2)_2$—, wherein $Z_1$ is hydrogen, $C_1$–$C_{18}$alkyl, allyl, benzyl, $C_2$–$C_{12}$alkanoyl or benzoyl;

$R_5$ is hydrogen, $C_1$–$C_{12}$alkyl, allyl, benzyl, glycidyl or $C_2$–$C_6$alkoxyalkyl;

$Q_1$ is —$N(R_7)$— or —O—;

E is $C_1$–$C_3$alkylene, the group —$CH_2CH(R_8)$—O—, wherein $R_8$ is hydrogen, methyl or phenyl, the group —$(CH_2)_3$—NH— or a direct bond;

$R_7$ is $C_1$–$C_{18}$alkyl, $C_5$–$C_7$cycloalkyl, $C_7$–$C_{12}$aralkyl, cyanoethyl, $C_6$–$C_{10}$aryl, the group —$CH_2CH(R_8)$—OH; or a group of formula

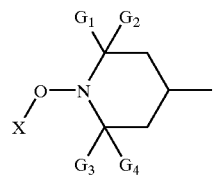

or a group of formula

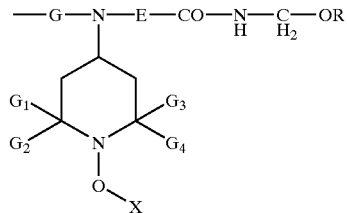

wherein G is $C_2$–$C_6$alkylene or $C_6$–$C_{12}$arylene and R is as defined above when m=1; or $R_7$ is a group —E—CO—NH—$CH_2$—$OR_6$;

$R_6$ is hydrogen or $C_1$–$C_{18}$alkyl;

formula (F) denotes a structural repeating unit of an oligomer, wherein T is ethylene or 1,2-propylene, or a structural repeating unit derived from an α-olefin copolymer with an alkyl acrylate or methacrylate;

k is a number from 2 to 100;

$R_{10}$ is hydrogen, $C_1$–$C_{12}$alkyl or $C_1$–$C_{12}$alkoxy;

$T_2$ has the same meanings as $R_4$;

$T_3$ and $T_4$ are each independently of the other $C_2$–$C_{12}$alkylene, or $T_4$ is a group

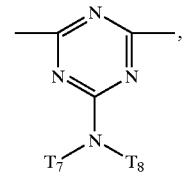

$T_5$ is $C_2$–$C_{22}$alkylene, $C_5$–$C_7$cycloalkylene, $C_1$–$C_4$alkylenedi($C_5$–$C_7$cycloalkylene), phenylene or phenylenedi($C_1$–$C_4$alkylene);

$T_6$ is 

wherein a, b and c are each independently of the others 2 or 3, and d is 0 or 1;

e is 3 or 4;

$E_1$ and $E_2$ are different and are oxo or imino;

$E_3$ is hydrogen, $C_1$–$C_{30}$alkyl, phenyl, naphthyl, it being possible for the phenyl or naphthyl to be substituted by chlorine or by $C_1$–$C_4$alkyl, or $C_7$–$C_{12}$phenylalkyl or $C_1$–$C_4$alkyl-substituted $C_7$–$C_{12}$phenylalkyl;

$E_4$ is hydrogen, $C_1$–$C_{30}$alkyl, phenyl, naphthyl or $C_7$–$C_{12}$phenylalkyl; or $E_3$ and $E_4$ together are $C_4$–$C_{17}$polymethylene, which may be substituted by up to 4 $C_1$–$C_4$alkyl groups; and $E_8$ is an aliphatic or aromatic tetravalent radical.

7. A process according to claim 5, wherein $G_1$, $G_2$, $G_3$ and $G_4$ are methyl, and $G_5$ and $G_6$ are hydrogen or $G_1$ and $G_3$ are ethyl, $G_2$ and $G_4$ are methyl, $G_5$ is hydrogen and $G_6$ is methyl.

8. A process according to claim 6, wherein the structural unit of formula (I) corresponds to the structural formula A, B, O or P wherein m is 1, R is hydrogen, $C_1$–$C_{18}$alkyl uninterrupted or interrupted by one or more oxygen atoms, cyanoethyl, benzyl, glycidyl, a monovalent radical of an aliphatic carboxylic acid having from 2 to 18 carbon atoms, of a cycloaliphatic carboxylic acid having from 7 to 15 carbon atoms, of an α,β-unsaturated carboxylic acid having from 3 to 5 carbon atoms or of an aromatic carboxylic acid having from 7 to 15 carbon atoms;

p is 1;

$R_1$ is $C_1$–$C_{12}$alkyl, $C_5$–$C_7$cycloalkyl, $C_7$–$C_8$aralkyl, $C_2$–$C_{18}$alkanoyl, $C_3C_5$alkenoyl or benzoyl;

$R_2$ is $C_1$–$C_{18}$alkyl, $C_5$–$C_7$cycloalkyl, $C_2$–$C_8$alkenyl, each unsubstituted or substituted by a cyano, carbonyl or carbamide group, or glycidyl, a group of formula —$CH_2CH(OH)$—Z or of formula —CO—Z— or —CONH—Z, wherein Z is hydrogen, methyl or phenyl.

9. A process according to claim 6, wherein the compound corresponds to structural formula A or B wherein R is hydrogen, $C_1$–$C_{18}$alkyl, cyanoethyl, benzoyl, glycidyl, a monovalent radical of an aliphatic carboxylic acid having from 2 to 18 carbon atoms;

$R_1$ is $C_1$–$C_{12}$alkyl, $C_7$–$C_8$aralkyl, $C_2$–$C_{18}$alkanoyl, $C_3$–$C_5$alkenoyl or benzoyl;

$R_2$ is $C_1$–$C_{18}$alkyl, glycidyl, a group of formula —$CH_2CH(OH)$—Z or of formula —CO—Z, wherein Z is hydrogen, methyl or phenyl; and X is benzyl, allyl, cyclopentyl. cyclohexyl or —C(=O)—$C_1$–$C_{38}$alkyl.

10. A process according to claim 1, wherein X is selected from the group consisting of $C_1$–$C_{18}$alkyl, benzyl, allyl, cyclopentyl, cyclohexyl, —C(=O)—$C_1$–$C_{38}$alkyl, —C(=O)—$C_1$–$C_{19}$alkenyl, —C(=O)—$C_6$–$C_{10}$aryl.

11. A process according to claim 1, wherein the functional compound having at least two unsaturated carbon bonds is triallyl isocyanurate, triallyl cyanurate, 1,3-phenylenebismaleimide, 1,8-bismaleimido-3,6-dioxaoctane, trimethylolpropane tri(meth)acrylate, pentaerythritol tetra(meth)acrylate or the bismaleimide of 4,4'-diaminophenylmethane.

12. A process according to claim 1, wherein the functional compound having at least two unsaturated carbon bonds is present in an amount of from 0.1 to 10% by weight, based on the polyolefin.

13. A process according to claim 1, wherein the alkoxyamine is present in an amount of from 0.01 to 5% by weight, based on the polymer.

14. A process according to claim 1, wherein the functional compound having at least two unsaturated carbon bonds is present in a ratio of from 10:1 to 1:5 relative to the alkoxyamine compound.

15. A thermoplastic polymer obtained in accordance with the process of claim 1.

16. A composition comprising
a) a non-halogen-containing thermoplastic polymer;
b) a functional compound having at least two unsaturated carbon bonds which is a polyalkenyl compound, a polymaleimide, an ester of a polyhydridic alcohol with an α,β-unsaturated $C_3$–$C_5$ carboxylic acid, or an allyl ester of a polycarboxylic acid; and
c) an alkoxyamine having a structural unit

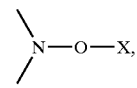

which forms free radicals at the melting temperature/processing temperature;

wherein

X is selected from the group consisting of —C(=O)—$C_1$–$C_{38}$alkyl, —C(=O)—$C_1$–$C_{19}$alkenyl, —C(=O)—$C_5$–$C_{10}$aryl, —C(=O)—O—$C_1$–$C_5$alkyl, —C(=O)—O—$C_6$–$C_{10}$aryl, —C(=O)—NH—$C_1$–$C_6$alkyl, —C(=O)—NH—$C_6$–$C_{10}$aryl, —C(=O)—N($C_1$–$C_6$alkyl)$_2$, —P=O(—$C_1$–$C_{19}$alkyl)$_2$, —P=O(—$C_6$–$C_{10}$aryl)$_2$, —P=O(—O—$C_1$–$C_6$alkyl)$_2$, —P=O(—O—$C_6$–$C_{10}$aryl)$_2$, —P(—O—$C_1$–$C_6$alkyl)$_2$, —P(—O—$C_6$–$C_{10}$aryl)$_2$, $C_1$–$C_{18}$alkyl, $C_3$–$C_{18}$alkenyl, $C_3$–$C_{18}$alkynyl, phenyl, phenyl($C_7$–$C_{11}$)alkyl, phenyl or phenyl($C_7$–$C_{11}$)alkyl substituted by $C_1$–$C_{12}$alkyl, $C_1$–$C_{12}$alkoxy, OH, amino, $C_1$–$C_{12}$alkylamino, $C_1$–$C_{12}$dialkylamino, $NO_2$ or by halogen, $C_3$–$C_7$cycloalkyl, and a group

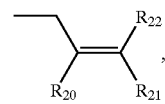

wherein $R_{20}$, $R_{21}$ and $R_{22}$ are hydrogen, $C_1$–$C_{12}$alkyl, $C_2$–$C_{12}$alkenyl, phenyl or $C_3$–$C_7$cycloalkyl.

* * * * *